(12) United States Patent
Jung et al.

(10) Patent No.: US 11,171,705 B2
(45) Date of Patent: Nov. 9, 2021

(54) DEVICE AND METHOD FOR DETECTING BEAM MISALIGNMENT IN WIRELESS COMMUNICATION SYSTEM

(71) Applicant: Samsung Electronics Co., Ltd., Suwon-si (KR)

(72) Inventors: Doyoung Jung, Suwon-si (KR); Yibin Sun, Suwon-si (KR); Jung-Min Moon, Suwon-si (KR); Ingil Baek, Suwon-si (KR); Junhee Jeong, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 192 days.

(21) Appl. No.: 16/464,509

(22) PCT Filed: Mar. 14, 2017

(86) PCT No.: PCT/KR2017/002758
§ 371 (c)(1),
(2) Date: May 28, 2019

(87) PCT Pub. No.: WO2018/097416
PCT Pub. Date: May 31, 2018

(65) Prior Publication Data
US 2021/0111778 A1    Apr. 15, 2021

(30) Foreign Application Priority Data

Nov. 28, 2016  (KR) .......................... 10-2016-0159169
Feb. 10, 2017  (KR) .......................... 10-2017-0018714

(51) Int. Cl.
*H04B 7/06*    (2006.01)
*H04W 76/28*    (2018.01)
(Continued)

(52) U.S. Cl.
CPC ......... *H04B 7/0695* (2013.01); *H04B 7/0486* (2013.01); *H04B 7/088* (2013.01);
(Continued)

(58) Field of Classification Search
CPC .... H04B 7/0486; H04B 7/0695; H04B 7/088; H04L 5/005; H04W 16/28; H04W 24/10; H04W 76/28
See application file for complete search history.

(56) References Cited

U.S. PATENT DOCUMENTS 6,417,803 B1 *   7/2002   de La Chapelle ........ G01S 3/20
                                                    342/354
9,377,522 B2     6/2016   Edge et al.
(Continued)

FOREIGN PATENT DOCUMENTS

BR    112017005119 A2 *  7/2018  ........... H04B 7/0408
CN       105745846 A *   7/2016  ........... H04B 7/0408
(Continued)

OTHER PUBLICATIONS

Samsung, Discussions on Beam Recovery, Oct. 10, 2016, 3GPP, 3GPP TSG RAN WG1 #86 bis, Tdoc: R1-1609081 (Year: 2016).*
(Continued)

*Primary Examiner* — Eric Nowlin
(74) *Attorney, Agent, or Firm* — Jefferson IP Law, LLP

(57) ABSTRACT

Disclosed is a fifth generation (5G) or pre-5G communication system for supporting a data transmission rate higher than that of a fourth generation (4G) communication system such as long term evolution (LTE). The purpose of the disclosure is to detect beam misalignment in a wireless communication system, and a terminal operation method comprises the steps of: receiving multiple reference signals for a first period; receiving multiple reference signals for a second period; and determining whether a beam is mis-
(Continued)

aligned, on the basis of a first measurement value set for the multiple reference signals received for the first period and a second measurement value set for the multiple reference signals received for the second period. The study has been performed under the support of the "Government-wide Giga KOREA Business" of the Ministry of Science, ICT and Future Planning.

19 Claims, 29 Drawing Sheets

(51) Int. Cl.
  H04B 7/0456    (2017.01)
  H04B 7/08     (2006.01)
  H04L 5/00     (2006.01)
  H04W 24/10    (2009.01)
(52) U.S. Cl.
  CPC ............ *H04L 5/005* (2013.01); *H04W 24/10* (2013.01); *H04W 76/28* (2018.02)

(56) References Cited

U.S. PATENT DOCUMENTS

| | | | |
|---|---|---|---|
| 9,578,644 B2* | 2/2017 | Yu | H04B 7/0632 |
| 9,775,156 B2* | 9/2017 | Yu | H04B 7/0632 |
| 9,877,327 B2* | 1/2018 | Yu | H04W 48/20 |
| 10,103,800 B2* | 10/2018 | Kang | H04B 7/0695 |
| 10,251,071 B2* | 4/2019 | Yu | H04W 72/046 |
| 10,270,514 B2* | 4/2019 | Moon | H04B 7/0695 |
| 10,772,151 B2* | 9/2020 | Zhou | H04L 1/1812 |
| 10,812,161 B2* | 10/2020 | Mueck | H04B 7/0602 |
| 2008/0259731 A1* | 10/2008 | Happonen | H04R 3/005 367/121 |
| 2012/0062427 A1* | 3/2012 | Wu | H01Q 1/2258 342/450 |
| 2013/0039345 A1 | 2/2013 | Kim et al. | |
| 2013/0121185 A1* | 5/2013 | Li | H04W 24/10 370/252 |
| 2013/0244647 A1 | 9/2013 | Makh et al. | |
| 2013/0295852 A1* | 11/2013 | Kim | H04W 72/046 455/63.4 |
| 2013/0301567 A1 | 11/2013 | Jeong et al. | |
| 2014/0051351 A1 | 2/2014 | Jia | |
| 2014/0198696 A1* | 7/2014 | Li | H04W 52/0229 370/311 |
| 2014/0341310 A1* | 11/2014 | Rahman | H04L 5/0007 375/260 |
| 2015/0004918 A1* | 1/2015 | Wang | H04W 48/16 455/73 |
| 2015/0078189 A1* | 3/2015 | Kwon | H04W 24/08 370/252 |
| 2015/0222345 A1 | 8/2015 | Chapman et al. | |
| 2016/0095003 A1* | 3/2016 | Yu | H04B 7/0695 370/311 |
| 2016/0095102 A1* | 3/2016 | Yu | H04B 7/0617 455/452.2 |
| 2016/0150435 A1* | 5/2016 | Baek | H04W 24/10 370/252 |
| 2016/0192433 A1* | 6/2016 | Deenoo | H04W 72/046 370/329 |
| 2017/0054534 A1* | 2/2017 | Sang | H04W 72/046 |
| 2017/0127400 A1* | 5/2017 | Yu | H04B 7/0632 |
| 2017/0207845 A1* | 7/2017 | Moon | H04B 7/0695 |
| 2017/0273062 A1* | 9/2017 | Liu | H04B 7/0617 |
| 2017/0367082 A1* | 12/2017 | Yu | H04W 72/046 |
| 2019/0089420 A1* | 3/2019 | Koskela | H04B 7/0417 |
| 2019/0215896 A1* | 7/2019 | Zhou | H04B 7/088 |
| 2019/0253128 A1* | 8/2019 | Moon | H04B 7/0695 |
| 2019/0357292 A1* | 11/2019 | Cirik | H04L 5/0053 |
| 2020/0008260 A1* | 1/2020 | Islam | H04W 76/28 |
| 2020/0014444 A1* | 1/2020 | Mueck | H04B 7/0623 |
| 2020/0053824 A1* | 2/2020 | He | H04W 24/08 |
| 2020/0205219 A1* | 6/2020 | Chen | H04W 76/19 |
| 2020/0229002 A1* | 7/2020 | Kaikkonen | H04B 7/08 |
| 2020/0314675 A1* | 10/2020 | Lin | H04W 24/10 |
| 2020/0344835 A1* | 10/2020 | Wang | H04W 28/04 |
| 2020/0351788 A1* | 11/2020 | Landis | H04W 52/0245 |
| 2020/0373990 A1* | 11/2020 | Da Silva | H04W 74/0833 |
| 2020/0396035 A1* | 12/2020 | Yu | H04L 5/0089 |
| 2020/0404736 A1* | 12/2020 | Zhou | H04L 1/0027 |
| 2021/0028849 A1* | 1/2021 | Chin | H04B 7/0617 |
| 2021/0029724 A1* | 1/2021 | Tsai | H04W 28/0278 |
| 2021/0037397 A1* | 2/2021 | Guo | H04W 16/28 |
| 2021/0045103 A1* | 2/2021 | Kim | H04W 72/046 |
| 2021/0050902 A1* | 2/2021 | Islam | H04L 1/00 |

FOREIGN PATENT DOCUMENTS

| | | | | |
|---|---|---|---|---|
| CN | 109429551 A | * | 3/2019 | H04W 76/28 |
| CN | 105745846 B | * | 7/2019 | H04W 72/046 |
| CN | 110035502 A | * | 7/2019 | H04W 28/04 |
| CN | 110266351 A | * | 9/2019 | H04B 7/0632 |
| CN | 110475326 A | * | 11/2019 | |
| CN | 111052839 A | * | 4/2020 | H04W 24/08 |
| CN | 111357388 A | * | 6/2020 | H04B 7/0695 |
| CN | 111405530 A | * | 7/2020 | |
| EP | 3127250 A2 | * | 2/2017 | H04W 72/046 |
| EP | 3127250 A4 | * | 12/2017 | H04W 72/085 |
| EP | 3494648 A1 | * | 6/2019 | H04B 7/0617 |
| EP | 3127250 B1 | * | 1/2020 | H04B 7/0617 |
| EP | 3657689 A1 | * | 5/2020 | H04W 72/046 |
| EP | 3689098 A1 | * | 8/2020 | H04W 76/28 |
| EP | 3716713 A1 | * | 9/2020 | H04W 72/046 |
| ES | 2775585 T3 | * | 7/2020 | H04B 7/0408 |
| KR | 10-2013-0017932 A | | 2/2013 | |
| KR | 10-2013-0125903 A | | 11/2013 | |
| KR | 20200053585 A | * | 5/2020 | H04B 7/08 |
| WO | 2010/048745 A1 | | 5/2010 | |
| WO | WO-2016045621 A2 | * | 3/2016 | H04L 5/0057 |
| WO | WO-2016045621 A3 | * | 5/2016 | H04L 5/0057 |
| WO | WO-2018025070 A1 | * | 2/2018 | H04B 7/0617 |
| WO | WO-2019041244 A1 | * | 3/2019 | H04W 24/08 |
| WO | WQ-2019053340 A1 | * | 3/2019 | H04W 24/10 |
| WO | WO-2019137378 A1 | * | 7/2019 | H04W 28/04 |
| WO | WO-2020009761 A1 | * | 1/2020 | H04B 7/0695 |
| WO | WO-2020033069 A1 | * | 2/2020 | H04L 5/005 |
| WO | WO-2020200240 A1 | * | 10/2020 | H04W 52/0216 |
| WO | WO-2020222950 A1 | * | 11/2020 | H04B 7/0695 |

OTHER PUBLICATIONS

Nokia et al., DRX and Beam Management, Oct. 10, 2016, 3GPP, 3GPP TSG RAN WG1 #86 bis, Tdoc: R1-1610248 (Year: 2016).*
Interdigital, Beam-based Design Framework for New Radio, Oct. 10, 2016, 3GPP, 3GPP TSG RAN WG1 #86 bis, Tdoc: R1-1610319 (Year: 2016).*
Interdigital Communications, Robust and Efficient Beam Management for NR, Oct. 10, 2016, 3GPP, 3GPP TSG RAN WG1 #86 bis, Tdoc: R1-1610345 (Year: 2016).*
Intel Corporation, Preliminary Performance Evaluation of Different Beamforming Options for NR Synchronization Signals, Oct. 10, 2016, 3GPP, 3GPP TSG RAN WG1 #86 bis, Tdoc: R1-1610378 (Year: 2016).*
Nokia et al., DRX and Beam Management, Oct. 10, 2016, 3GPP, 3GPP TSG RAN WG1 #86 bis, Tdoc: R1-1610405 (Year: 2016).*
Samsung et al., WF on Beam Recovery, Oct. 10, 2016, 3GPP, 3GPP TSG RAN WG1 #86 bis, Tdoc: R1-1610964 (Year: 2016).*
Zte et al., Discussion on Beam Recovery Mechanism, Nov. 14, 2016, 3GPP, 3GPP TSG RAN WG1 #87, Tdoc: R1-1611422 (Year: 2016).*
LG Electronics, Views on Beam Recovery, Nov. 14, 2016, 3GPP TSG RAN WG1 #87, Tdoc: R1-1611819 (Year: 2016).*
Intel Corporation, Discussion on Beam Recovery in NR, Nov. 14, 2016, 3GPP, 3GPP TSG RAN WG1 #87, Tdoc: R1-1611982 (Year: 2016).*
Qualcomm Incorporated, Beam Recovery Procedures, Nov. 14, 2016, 3GPP, 3GPP TSG RAN WG1 #87, Tdoc: R1-1612059 (Year: 2016).*

(56) References Cited

OTHER PUBLICATIONS

Mediatek Inc., Beam Recovery Considerations for Above 6GHz, Nov. 14, 2016, 3GPP, 3GPP TSG RAN WG1 #87, Tdoc: R1-1612131 (Year: 2016).*
CMCC, Discussion on Beam Recovery for NR, Nov. 14, 2016, 3GPP, 3GPP TSG RAN WG1 #87, Tdoc: R1-1612189 (Year: 2016).*
Samsung, Discussion on Beam Recovery Mechanism, Nov. 14, 2016, 3GPP, 3GPP TSG RAN WG1 #87, Tdoc: R1-1612514 (Year: 2016).*
Interdigital Communications, Considerations on Beam Recovery for NR, Nov. 14, 2016, 3GPP, 3GPP TSG RAN WG1 #87, Tdoc: R1-1612614 (Year: 2016).*
Nokia et al., Beam Recovery in NR, Nov. 14, 2016, 3GPP, 3GPP TSG RAN WG1 #87, Tdoc: R1-1612865 (Year: 2016).*
Nokia et al., DRX and Beam Management, Nov. 14, 2016, 3GPP, 3GPP TSG RAN WG1 #87, Tdoc: R1-1612869 (Year: 2016).*
Samsung, NR Connected DRX Operation with Beamforming, Nov. 14, 2016, 3GPP, 3GPP TSG-RAN WG2 #95bis, Tdoc: R2-168816 (Year: 2016).*
Ericsson, DRX in NR Active Mode, Aug. 22, 2016, 3GPP, 3GPP TSG-RAN WG2 #95, Tdoc: R2-165329 (Year: 2016).*
Samsung, C-DRX for NR, Oct. 10, 2016, 3GPP, 3GPP TSG-RAN WG2 #95bis, Tdoc: R2-166358 (Year: 2016).*
Ericsson, Adapting the LTE DRX Framework for NR, Oct. 10, 2016, 3GPP, 3GPP TSG-RAN WG2 #95bis, Tdoc: R2-166816 (Year: 2016).*
Nokia et al., Beam Sweeping, Oct. 10, 2016, 3GPP, 3GPP TSG-RAN WG2 #95bis, Tdoc: R2-167670 (Year: 2016).*
Nokia et al., UE and Network Based Beam Management in NR, Nov. 14, 2016, 3GPP, 3GPP TSG-RAN WG2 #95bis, Tdoc: R2-167675 (Year: 2016).*
Nokia et al., Beam Management in NR, Nov. 14, 2016, 3GPP, 3GPP TSG-RAN WG2 #95bis, Tdoc: R2-167676 (Year: 2016).*
Nokia et al., Beam Recovery in NR, Nov. 14, 2016, 3GPP, 3GPP TSG-RAN WG2 #95bis, Tdoc: R2-167713 (Year: 2016).*
Qualcomm Incorporated, Wake-Up Schemes for DRX in NR, Nov. 14, 2016, 3GPP, 3GPP TSG-RAN WG2 #95bis, Tdoc: R2-168612 (Year: 2016).*
Ericsson, Baseline Framework for NR DRX, Nov. 14, 2016, 3GPP, 3GPP TSG-RAN WG2 #95bis, Tdoc: R2-168664 (Year: 2016).*
Partial Supplementary European Search Report dated Nov. 11, 2019, issued in European Application No. 17874835.6.
Tsang et al., Detecting Human Blockage and Device Movement in mmWave Communication System, 2011 IEEE Global Telecommunications Conference—GLOBECOM 2011, Dec. 5-9, 2011.
M, Agiwal et al., "Directional-DRX for 5G wireless communications", vol. 52 No. 21, pp. 1816-1818, Oct. 13, 2016.
Kwon et al., "Performance analysis of DRX Mechanism Considering Analogue Beamforming in Millimeter-Wave Mobile Broadband System", Globecom 2014 Workshop—Emerging Technologies for 5G Wireless Cellular Networks, 2014.
Extended European Search Report dated Apr. 9, 2020, issued in European Patent Application No. 17874835.6.
Indian Office Action dated Jun. 18, 2021, issued in a counterpart an Indian Application No. 201947021988.

* cited by examiner

DEVICE AND METHOD FOR DETECTING BEAM MISALIGNMENT IN WIRELESS COMMUNICATION SYSTEM

CROSS-REFERENCE TO RELATED APPLICATION(S)

This application is a U.S. National Stage application under 35 U.S.C. § 371 of an International application number PCT/KR2017/002758, filed on Mar. 14, 2017, which is based on and claimed priority of a Korean patent application number 10-2016-0159169, filed on Nov. 28, 2016 and of a Korean patent application number 10-2017-0018714, filed on Feb. 10, 2017 in the Korean Intellectual Property Office, the disclosure of which is incorporated by reference herein in its entirety.

TECHNICAL FIELD

The disclosure relates generally to a wireless communication system, and more specifically, relates to an apparatus and a method for detecting beam misalignment in the wireless communication system.

This research has been carried out with support of 'Government-wide Giga KOREA business' of the Ministry of Science, ICT and future planning.

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

DISCLOSURE OF INVENTION

Technical Problem

Based on the discussions described above, the disclosure provides an apparatus and a method for effectively performing beamforming in a wireless communication system.

In addition, the disclosure provides an apparatus and a method for using a best beam in a wireless communication system.

In addition, the disclosure provides an apparatus and a method for detecting beam misalignment in a wireless communication system.

In addition, the disclosure provides an apparatus and a method for solving a beam misalignment situation in a wireless communication system.

In addition, the disclosure provides an apparatus and a method for triggering intensive reference signal transmission for beam search in a wireless communication system.

In addition, the disclosure provides an apparatus and a method for determining a serving beam based on a measurement pattern of transmit beams in a wireless communication system.

In addition, the disclosure provides an apparatus and a method for determining a serving beam based on a measurement value of a sensor in a wireless communication system.

Solution to Problem

According to various embodiments of the disclosure, a method for operating a terminal in a wireless communication system includes receiving a plurality of reference signals for a first period, receiving a plurality of reference signals for a second period, and determining whether a beam is misaligned based on a first set of measurement values for the plurality of the reference signals received for the first period and a second set of measurement values for the plurality of the reference signals received for the second period.

According to various embodiments of the disclosure, a method for operating a terminal in a wireless communication system includes activating a receiving circuit, to receive a signal, in an on duration of a discontinuous operation mode, if a sleep duration arrives, deactivating the receiving circuit, after a first portion of the sleep duration passes, determining whether a beam is misaligned, and if the beam misalignment occurs, activating the receiving circuit to recover the beam for a second portion of the sleep duration.

According to various embodiments of the disclosure, an apparatus for a terminal in a wireless communication system includes a receiving unit for receiving a plurality of reference signals for a first period and receiving a plurality of reference signals for a second period, and a controller for determining whether a beam is misaligned based on a first set of measurement values for the plurality of the reference signals received for the first period and a second set of measurement values for the plurality of the reference signals received for the second period.

According to various embodiments of the disclosure, an apparatus for a terminal in a wireless communication system includes a receiving circuit selectively activated in a discontinuous operation mode, and a controller for controlling the receiving circuit. Herein, the controller activates the receiving circuit, to receive a signal, in an on duration of the discontinuous operation mode, if a sleep duration arrives, deactivates the receiving circuit, after a first portion of the sleep duration passes, determines whether a beam is misaligned, and if the beam misalignment occurs, activates the receiving circuit to recover the beam for a second portion of the sleep duration.

Advantageous Effects of Invention

An apparatus and a method according to various embodiments of the disclosure may enable more accurate determination of beam misalignment, by detecting the beam misalignment using measurement results for a plurality of beams.

Effects obtainable from the disclosure are not limited to the above mentioned effects, and other effects which are not mentioned may be clearly understood by those skilled in the art of the present invention through the following descriptions.

BEST MODE FOR CARRYING OUT THE INVENTION

Terms used in the disclosure are used for describing particular embodiments and are not intended to limit the scope of other embodiments. A singular form may include a plurality of forms unless it is explicitly differently represented. All the terms used herein, including technical and scientific terms, may have the same meanings as terms generally understood by those skilled in the art to which the disclosure pertains. Among terms used in the disclosure, the terms defined in a general dictionary may be interpreted to have the same or similar meanings with the context of the relevant art, and, unless explicitly defined in this disclosure, it shall not be interpreted ideally or excessively as formal meanings. In some cases, even terms defined in this disclosure-+ should not be interpreted to exclude the embodiments of the disclosure.

In various embodiments of the disclosure to be described below, a hardware approach will be described as an example. However, since the various embodiments of the disclosure include a technology using both hardware and software, the various embodiments of the disclosure do not exclude a software-based approach.

Hereafter, various embodiments of the disclosure provide an apparatus and a method for detecting beam misalignment in a wireless communication system. In addition, the disclosure relates to an apparatus and a method for beam recovery in case of beam misalignment in a wireless communication system.

Terms indicating signals, terms indicating channels, terms indicating control information, terms indicating network entities, and terms indicating components of an apparatus, which are used in the following descriptions, are for the sake of explanations. Accordingly, the disclosure is not limited to the terms to be described, and may use other terms having technically identical meaning.

The disclosure provides various embodiments using terms used in some communication standards (e.g., long term evolution (LTE) system and LTE-advanced (LTE-A)) by way of example. Various embodiments of the disclosure may be easily modified and applied in other communication systems.

Figure 1:
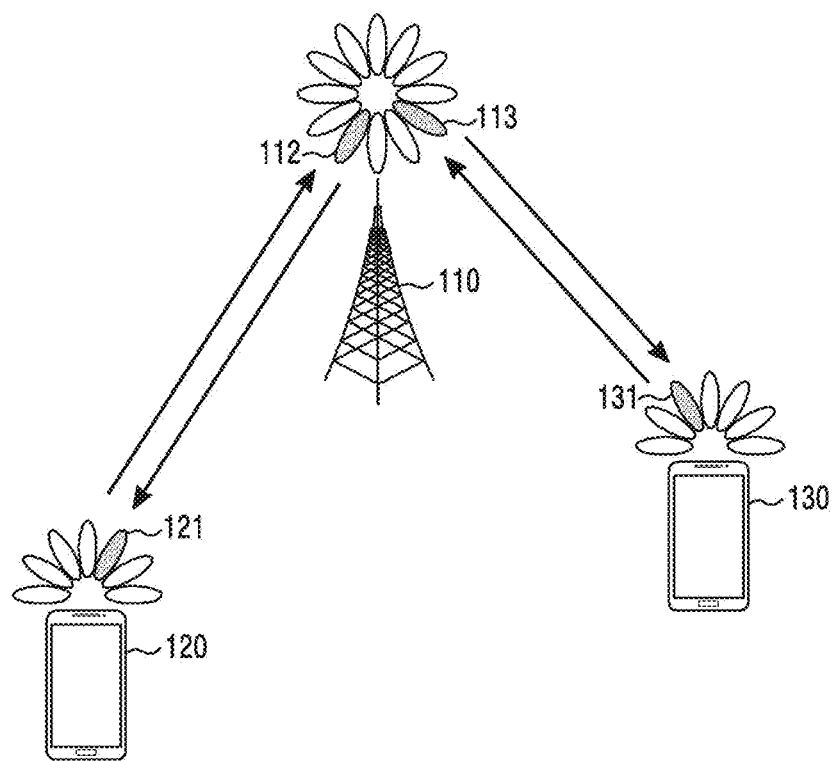
FIG. 1 illustrates a wireless communication system according to various embodiments of the disclosure.

FIG. 1 illustrates a wireless communication system according to various embodiments of the disclosure. FIG. 1 depicts a base station 110, a terminal 120, and a terminal 130, as some of nodes which use a radio channel in the wireless communication system.

The base station 110 is a network infrastructure which provides radio access to the terminals 120 and 130. The base station 110 has coverage defined as a geographical area based on a signal transmission distance. The base station 110 may be referred to as an access point (AP), an eNodeB (eNB), a 5th generation node (5G node), a wireless point, a transmission/reception point (TRP), and so on.

The terminal 120 and the terminal 130 each are a device used by a user, and communicate with the base station 110 over a radio channel. In some cases, at least one of the terminal 120 and the terminal 130 performs machine type communication (MTC) and may not be carried by the user. The terminal 120 and the terminal 130 each may be referred to as a user equipment (UE), a mobile station, a subscriber station, a remote terminal, a wireless terminal, or a user device.

The base station 110, the terminal 120, and the terminal 130 may transmit and receive radio signals in a millimeter wave (mmWave) band (e.g., 28 GHz, 30 GHz, 60 GHz). In so doing, to improve channel gain, the base station 110, the terminal 120, and the terminal 130 may conduct beamforming. Herein, the beamforming may include transmit beamforming and receive beamforming. That is, the base station 110, the terminal 120, and the terminal 130 may apply directivity to a transmit signal or a receive signal. For doing so, the base station 110 and the terminals 120 and 130 may select serving beams 112, 113, 121, and 131 through a beam search procedure.

Figure 2:
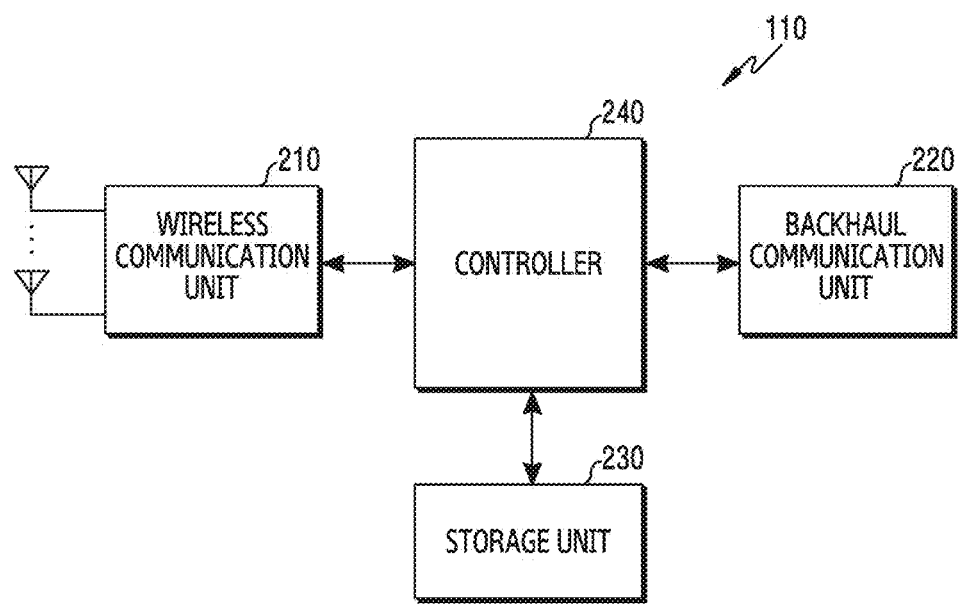
FIG. 2 illustrates a configuration of a base station in a wireless communication system according to various embodiments of the disclosure.

FIG. 2 illustrates a configuration of a base station in a wireless communication system according to various embodiments of the disclosure. A term such as 'portion' or '~er' used hereafter indicates a unit for processing at least one function or operation, and may be implemented using hardware, software, or a combination of hardware and software.

Referring to FIG. 2, the base station 110 includes a wireless communication unit 210, a backhaul communication unit 220, a storage unit 230, and a controller 240.

The wireless communication unit 210 may perform functions for transmitting and receiving signals over a radio channel. For example, the wireless communication unit 210 performs a conversion function between a baseband signal and a bit string according to a physical layer standard of the system. For example, in data transmission, the wireless communication unit 210 generates complex symbols by encoding and modulating a transmit bit string. Also, in data reception, the wireless communication unit 210 restores a receive bit string by demodulating and decoding a baseband signal. Also, the wireless communication unit 210 up-converts the baseband signal to a radio frequency (RF) band signal, transmits it via an antenna, and down-converts an RF band signal received via an antenna to a baseband signal.

For doing so, the wireless communication unit 210 may include a transmit filter, a receive filter, an amplifier, a mixer, an oscillator, a digital to analog convertor (DAC), an analog to digital convertor (ADC), and so on. In addition, the wireless communication unit 210 may include a plurality of transmit and receive paths. Further, the wireless communication unit 210 may include at least one antenna array including a plurality of antenna elements. In terms of the hardware, the wireless communication unit 210 may include a digital unit and an analog unit, and the analog unit may include a plurality of sub-units according to an operating power and an operating frequency.

The wireless communication unit 210 transmits and receives the signals as stated above. Hence, the wireless communication unit 210 may be referred to as a transmitter, a receiver, or a transceiver. Also, in the following, the transmission and the reception over the radio channel is used as the meaning which embraces the above-stated processing of the wireless communication unit 210.

The backhaul communication unit 220 provides an interface for communicating with other nodes in the network. That is, the backhaul communication unit 220 converts a bit sting transmitted from the base station to another node, for example, to another access node, another base station, an upper node, or a core network, to a physical signal, and converts a physical signal received from the other node to a bit string.

The storage unit 230 stores a basic program for operating the base station 110, an application program, and data such as setting information. The storage unit 230 may include a volatile memory, a non-volatile memory, or a combination of a volatile memory and a non-volatile memory. The storage unit 230 provides the stored data at a request of the controller 240.

The controller 240 controls general operations of the base station. For example, the controller 240 transmits and receives signals through the wireless communication unit 210 or the backhaul communication unit 220. Also, the controller 240 records and reads data in and from the storage unit 230. For doing so, the controller 240 may include at least one processor. For example, the controller 240 may control the base station 110 to carry out operations to be explained according to various embodiments.

Figure 3:
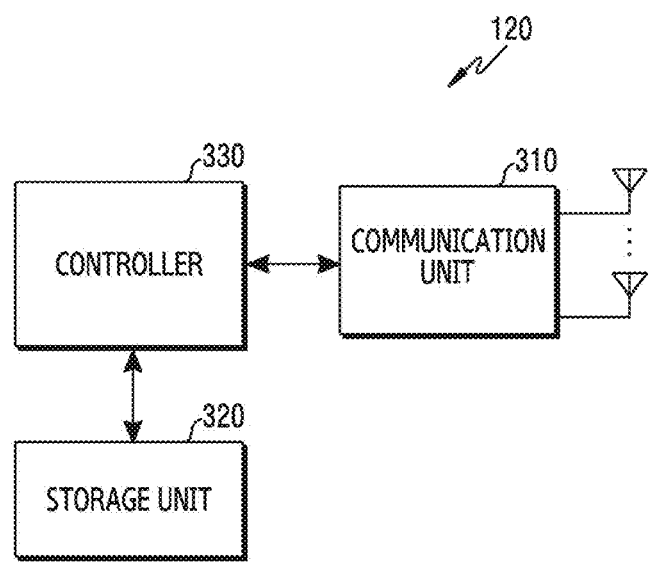
FIG. 3 illustrates a configuration of a terminal in a wireless communication system according to various embodiments of the disclosure.

FIG. 3 illustrates a configuration of a terminal in a wireless communication system according to various embodiments of the disclosure. A term such as 'portion' or '~er' used hereafter indicates a unit for processing at least one function or operation, and may be implemented using hardware, software, or a combination of hardware and software.

Referring to FIG. 3, the terminal 120 includes a communication unit 310, a storage unit 320, and a controller 330.

The communication unit 310 may perform functions for transmitting and receiving signals over a radio channel. For example, the communication unit 310 performs a conversion function between a baseband signal and a bit string according to a physical layer standard of the system. For example, in data transmission, the communication unit 310 generates complex symbols by encoding and modulating a transmit bit string. Also, in data reception, the communication unit 310 restores a receive bit string by demodulating and decoding a baseband signal. Also, the communication unit 310 up-converts the baseband signal to an RF band signal, transmits it via an antenna, and down-converts an RF band signal received via the antenna to a baseband signal. For example, the communication unit 310 may include a transmit filter, a receive filter, an amplifier, a mixer, an oscillator, a DAC, an ADC, and the like.

Also, the communication unit 310 may include a plurality of transmit and receive paths. Further, the communication unit 310 may include at least one antenna array including a plurality of antenna elements. In view of the hardware, the wireless communication unit 210 may include a digital circuit and an analog circuit (e.g., an RF integrated circuit (RFIC)). Herein, the digital circuit and the analog circuit may be implemented as a single package. Also, the communication unit 310 may include a plurality of RF chains. Further, the communication unit 310 may perform the beamforming.

The communication unit 310 transmits and receives the signals as stated above. Hence, the communication unit 310 may be referred to as a transmitter, a receiver, or a transceiver. In addition, the transmission and the reception over the radio channel are used as the meaning which embraces the above-stated processing of the communication unit 310 in the following explanations.

The storage unit 320 stores a basic program for operating the terminal 120, an application program, and data such as setting information. The storage unit 320 may include a volatile memory, a non-volatile memory, or a combination of a volatile memory and a non-volatile memory. The storage unit 320 provides the stored data according to a request of the controller 330.

The controller 330 controls general operations of the terminal 120. For example, the controller 330 transmits and receives signals through the communication unit 310. Also, the controller 330 records and reads data in and from the storage unit 320. For doing so, the controller 330 may include at least one processor or microprocessor, or may be part of a processor. Part of the communication unit 310 and the controller 330 may be referred to as a communication processor (CP). In particular, the controller 330 may control the terminal 120 to detect beam misalignment and perform a beam recovery procedure according to various embodiments to be described. For example, the controller 330 may control the terminal to carry out operations to be explained according to various embodiments.

Figure 4A:
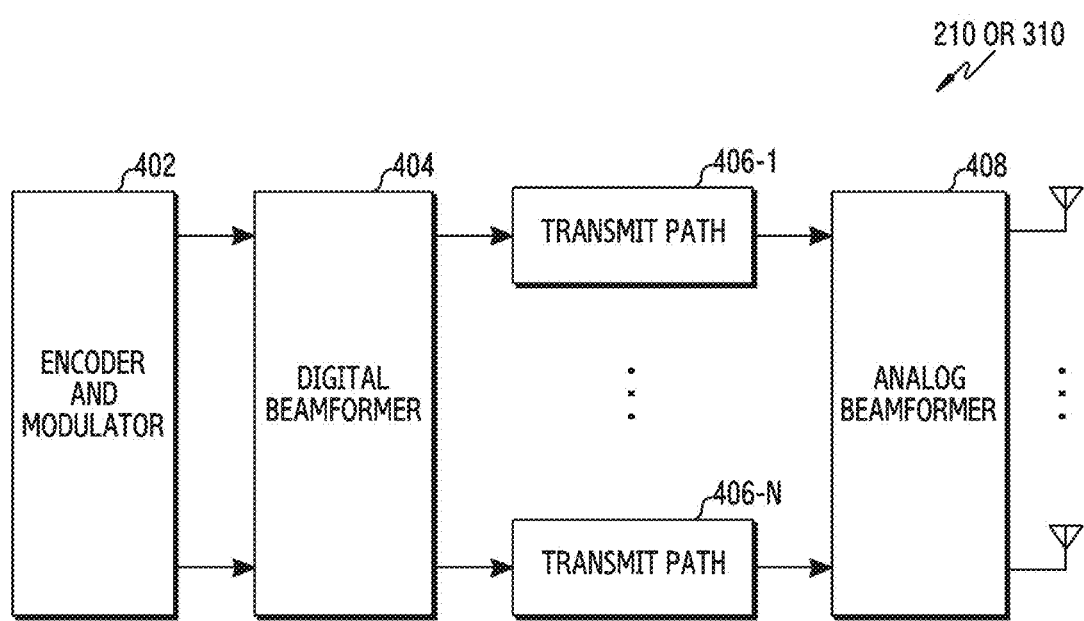
FIGS. 4A through 4C illustrate a configuration of a communication unit in a wireless communication system according to various embodiments of the disclosure.
Figure 4B:
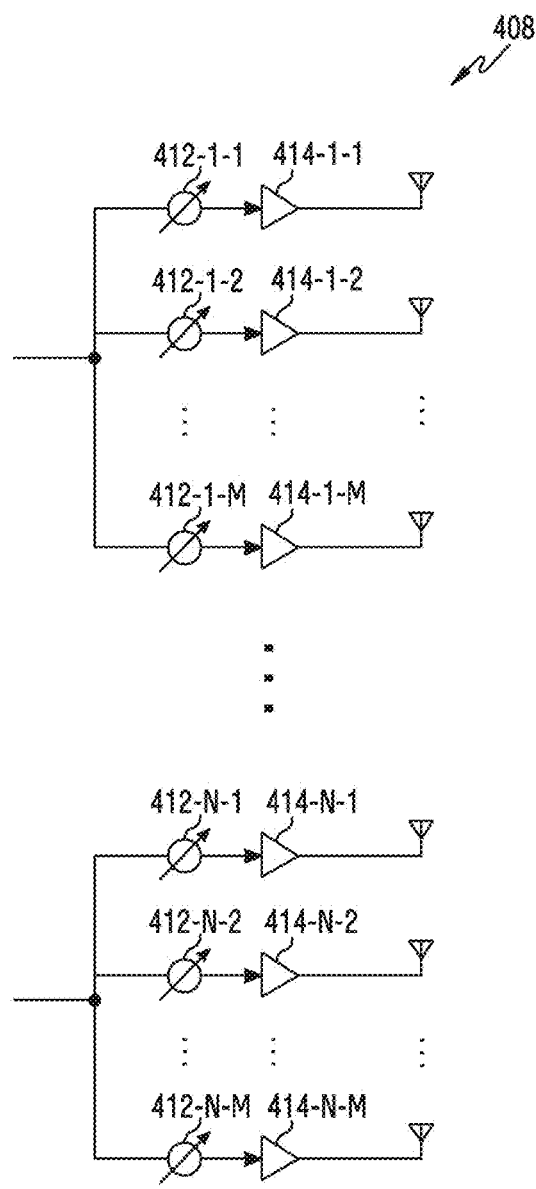
Figure 4C:
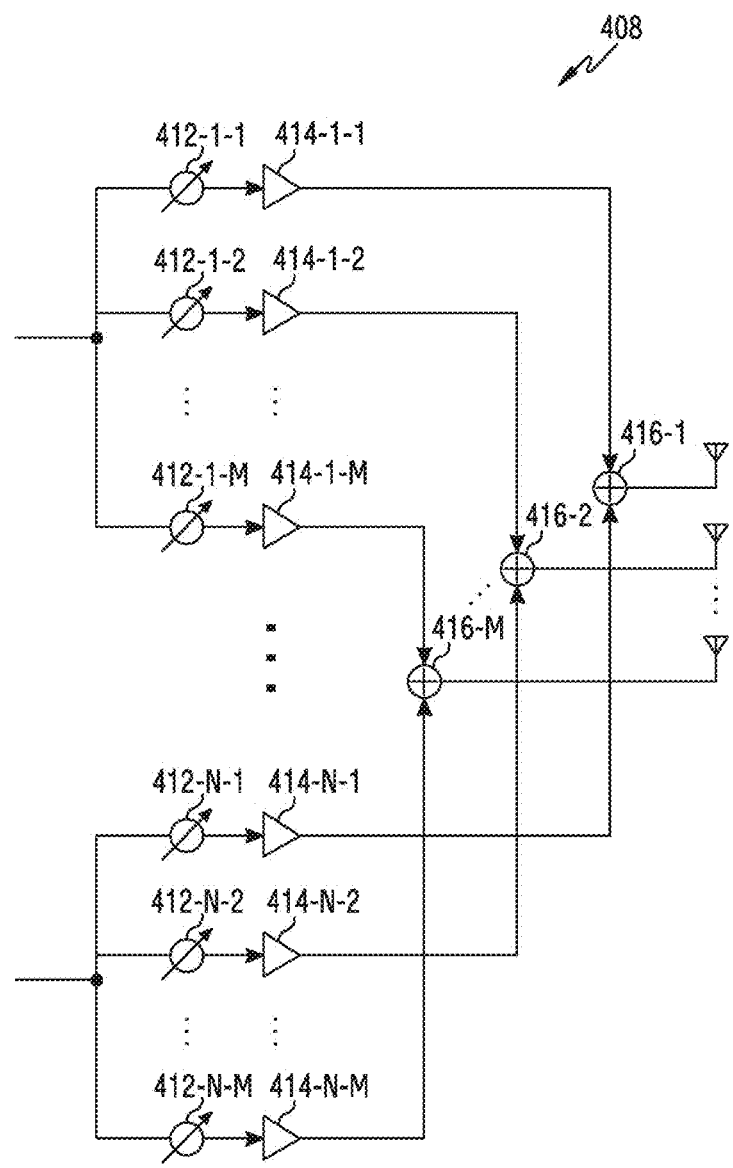

FIGS. 4A through 4C illustrate a configuration of a communication unit in a wireless communication system according to various embodiments of the disclosure. FIGS. 4A through 4C depict an example of a detailed configuration of the wireless communication unit 210 of FIG. 2 or the communication unit 310 of FIG. 3. More specifically, FIGS. 4A through 4C depict components for performing the beamforming, as part of the wireless communication unit 210 of FIG. 2 or the communication unit 310 of FIG. 3.

Referring to FIG. 4A, the wireless communication unit 210 or 310 includes an encoder and modulator 402, a digital beamformer 404, a plurality of transmit paths 406-1 through 406-N, and an analog beamformer 408.

The encoder and modulator 402 performs channel encoding. For the channel encoding, at least one of low density parity check (LDPC) code, convolution code, and polar code may be used. The encoder and modulator 402 generates modulation symbols through constellation mapping.

The digital beamformer 404 performs the beamforming on a digital signal (e.g., the modulation symbols). For doing so, the digital beamformer 404 multiplies the modulation symbols by beamforming weights. Herein, the beamforming weights are used to change an amplitude and a phase of the signal, and may be referred to as a precoding matrix, a precoder, and so on. The digital beamformer 404 outputs the digital-beamformed modulation symbols to the plurality of the transmit paths 406-1 through 406-N. In so doing, according to multiple input multiple output (MIMO) transmission, the modulation symbols may be multiplexed or the same modulation symbols may be provided to the plurality of the transmit paths 406-1 through 406-N.

The plurality of the transmit paths 406-1 through 406-N convert the digital-beamformed digital signals to analog signals. For doing so, the plurality of the transmit paths 406-1 through 406-N each may include an inverse fast fourier transform (IFFT) operator, a cyclic prefix (CP) adder, a DAC, and an up-converter. The CP adder is used for an orthogonal frequency division multiplexing (OFDM) scheme, and may be excluded if another physical layer scheme (e.g., filter bank multi-carrier (FBMC)) is applied. That is, the plurality of the transmit paths 406-1 through 406-N provide an independent signal process for a plurality of streams generated through the digital beamforming. Notably, depending on the implementation, some of the components of the plurality of the transmit paths 406-1 through 406-N may be used in common.

The analog beamformer 408 performs the beamforming on the analog signals. For doing so, the digital beamformer 404 multiplies the analog signals by the beamforming weights. Herein, the beamforming weights are used to change the amplitude and the phase of the signal. More specifically, the analog beamformer 408 may be configured as shown in FIG. 4B or FIG. 4C, according to a connection structure between the plurality of the transmit paths 406-1 through 406-N and the antennas.

Referring to FIG. 4B, signals inputted to the analog beamformer 408 are converted in phase/amplitude, amplified, and then transmitted via the antennas. In so doing, signals of each path are transmitted via different antenna sets, that is, antenna arrays. As for signals inputted in a first path, the signals are converted by phase/amplitude converters 412-1-1 through 412-1-M to signal strings having different or same phase/amplitude, amplified by amplifiers 414-1-1 through 414-1-M, and then transmitted via the antennas.

Referring to FIG. 4C, signals inputted to the analog beamformer 408 are converted in phase/amplitude, amplified, and then transmitted via antennas. In so doing, signals of each path are transmitted via the same antenna set, that is, the same antenna array. As for signals inputted in the first path, the signals are converted by the phase/magnitude converters 412-1-1 through 412-1-M to signal strings having different or the same phase/amplitude, and amplified by the amplifiers 414-1-1 through 414-1-M. Next, to transmit via a single antenna array, the amplified signals are summed by adders 416-1-1 through 416-1-M based on the antenna element and then transmitted via the antennas.

FIG. 4B depicts the example where the independent antenna array is used per transmit path, and FIG. 4C depicts the example where the transmit paths share one antenna array. However, according to another embodiment, some transmit paths may use the independent antenna array, and the rest transmit paths may share one antenna array. Further, according to yet another embodiment, by applying a switchable structure between the transmit paths and the antenna arrays, a structure which adaptively changes according to a situation may be used.

Figure 5:
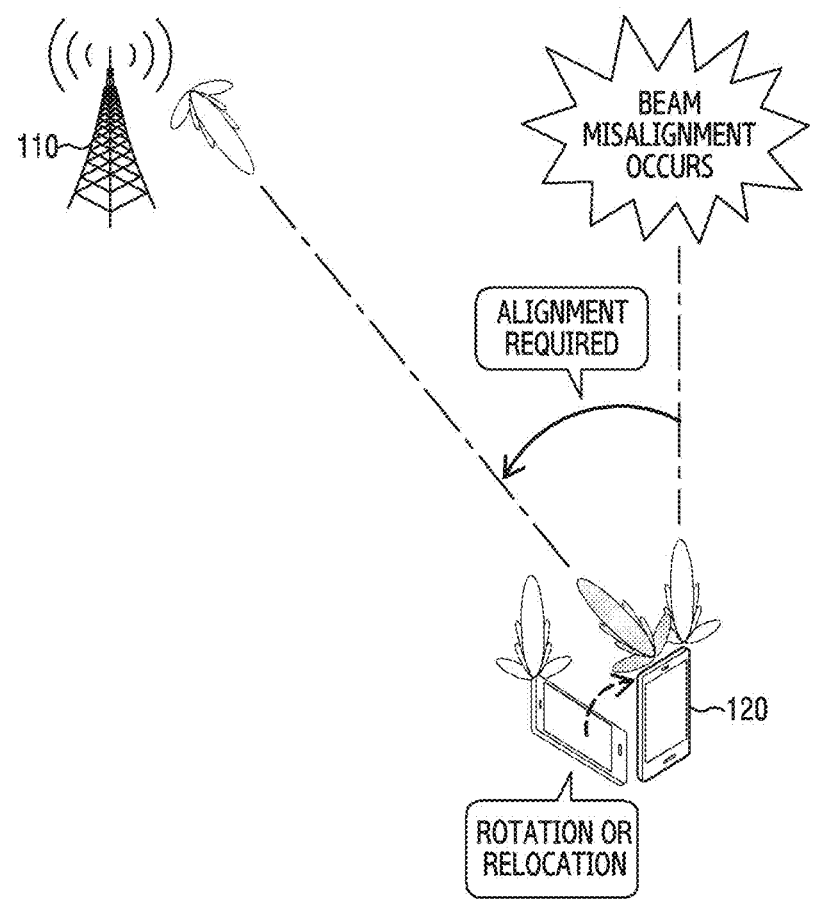
FIG. 5 illustrates a situation where beam misalignment occurs in a wireless communication system according to various embodiments of the disclosure.

FIG. 5 illustrates a situation where beam misalignment occurs in a wireless communication system according to various embodiments of the disclosure.

Referring to FIG. 5, a base station 110 and a terminal 120 use the best beam as a serving beam through a beam search procedure. In so doing, rotation or relocation of the terminal 120 may occur. In this case, if a direction of the beam set at the terminal 120 does not change, and the absolute direction of the beam also changes according to the rotation or the relocation of the terminal 120. Thus, the beam of the terminal 120 may not face the base station 110. That is, the beam of the terminal 120 is not the best beam any more, and this state is referred to as beam misalignment in the disclosure.

As described earlier, the beam misalignment indicates the state where the beam determined through a previous beam training procedure is not the best beam any more due to the rotation and the relocation of the terminal 120 or a change in a channel environment. If the beam misalignment occurs, a considerable loss of a link budget may occur until a new best beam is searched through a next beam training procedure. As a result, transmission and reception of data may not be feasible. For example, if a beam width is 15°, the link budget loss of about 2 through 3 dB is anticipated in case of the beam misalignment within 7°, and the link budget loss of about 10 through 20 dB is anticipated in case of the beam misalignment over 7°.

If the beam misalignment occurs as shown in FIG. 5, communication quality is degraded unless the serving beam is changed appropriately. However, the degradation of the communication quality does not necessarily indicate the beam misalignment. For example, the serving beam is the best beam but the communication quality may be degraded due to interference, fading, and so on. That is, if relying on the communication quality or channel quality alone, there is a possibility of determining error in the beam misalignment. Thus, the disclosure explains various embodiments for more accurately detecting the beam misalignment.

Figure 6:
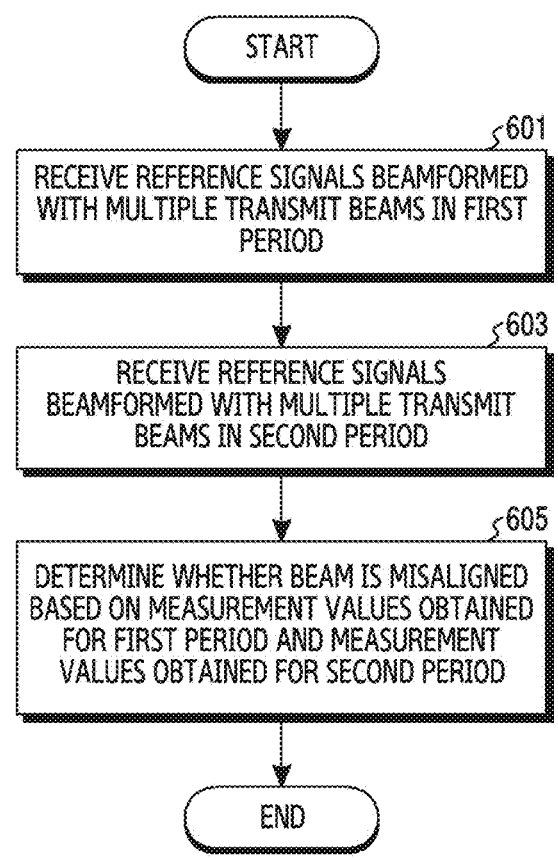
FIG. 6 illustrates an operating method of a terminal in a wireless communication system according to various embodiments of the disclosure.

FIG. 6 illustrates an operating method of a terminal in a wireless communication system according to various embodiments of the disclosure. FIG. 6 illustrates the operating method for the beam misalignment detection of the terminal 120.

Referring to FIG. 6, in step 601, the terminal receives reference signals which are beamformed with a plurality of transmit beams in a first period. Herein, the first period is one of periods where the base station repeatedly transmits reference signals for the beam search, and includes at least one time interval (e.g., subframe). That is, the base station sweeps the reference signals on a periodic basis or on an event basis. At this time, the terminal performs the receive beamforming using at least one receive beam. Hence, the terminal may obtain measurement values per receive beam. Herein, the measurement values are received strengths for the reference signal, and may be referred to as a 'reference signal received power (RSRP)'. Using the measurement values, the terminal may determine its serving receive beam.

Next, in step 603, the terminal receives the reference signals beamformed with the plurality of the transmit beams for a second period. Herein, the second period is one of the periods where the base station repeatedly transmits the reference signals for the beam search, and arrives after at least one time interval passes from the first period. That is, during communication, if the period for the base station to transmit the reference signals arrives, the terminal receives the reference signal transmitted from the base station. At this time, the terminal performs the receive beamforming using at least one receive beam. Hence, the terminal may obtain two different sets of measurement values acquired from the period of determining the serving beam and a subsequent period.

Next, in step 605, the terminal determines whether the beam is misaligned based on the measurement values obtained for the first period and the measurement values obtained for the second period. That is, the terminal may determine whether the beam misalignment occurs, by comparing the sets of measurement values for at least one receive beam and two or more transmit beams obtained at the different times. Herein, the compared measurement values may include or not include a measurement value for the serving beam. At this time, if there is no likelihood (or similarity) between the sets of measurement values, the terminal determines the occurrence of the beam misalignment. Herein, the rule for determining the presence or absence of the likelihood may be defined in various manners. For example, the rule for determining the likelihood may be defined based on at least one of the measurement values, an order of the measurement values, and statistics of the measurement values.

According to the embodiment described in FIG. 6, the beam misalignment may be detected based on the sets of measurement values for the same beam pairs acquired at the two different times. Since the base station repeatedly sweeps the reference signals for various purposes, the terminal may perform the measurement without additional overhead. In so doing, the measurement values for the comparison may be acquired merely through the measurement on the at least one receive beam.

In the embodiment of FIG. 6, the serving receive beam is determined by the measurement values obtained from the reference signals received in step 601. However, according to another embodiment, step 601 may be performed while the serving beam is already determined. In this case, the measurement values compared in step 605 may be measurement value measured in determining the serving beam, or measurement values measured from subsequent received reference signals (e.g., reference signals received in step 601).

In the embodiment of FIG. 6, the measurement values which are compared include the measurement values for at least one receive beam and a plurality of transmit beams. That is, the beam misalignment detection may be performed using only one receive beam. However, according to another embodiment, the measurement values for one base station transmit beam and a plurality of terminal receive beams may be used for the misalignment detection. That is, the misalignment detection according to another embodiment may be performed using only one transmit beam. While various embodiments to be described below are described on the assumption that at least one receive beam and a plurality of transmit beams are used for the sake of explanations, the embodiments may be easily applied even if a plurality of receive beams is used.

Figure 7A:
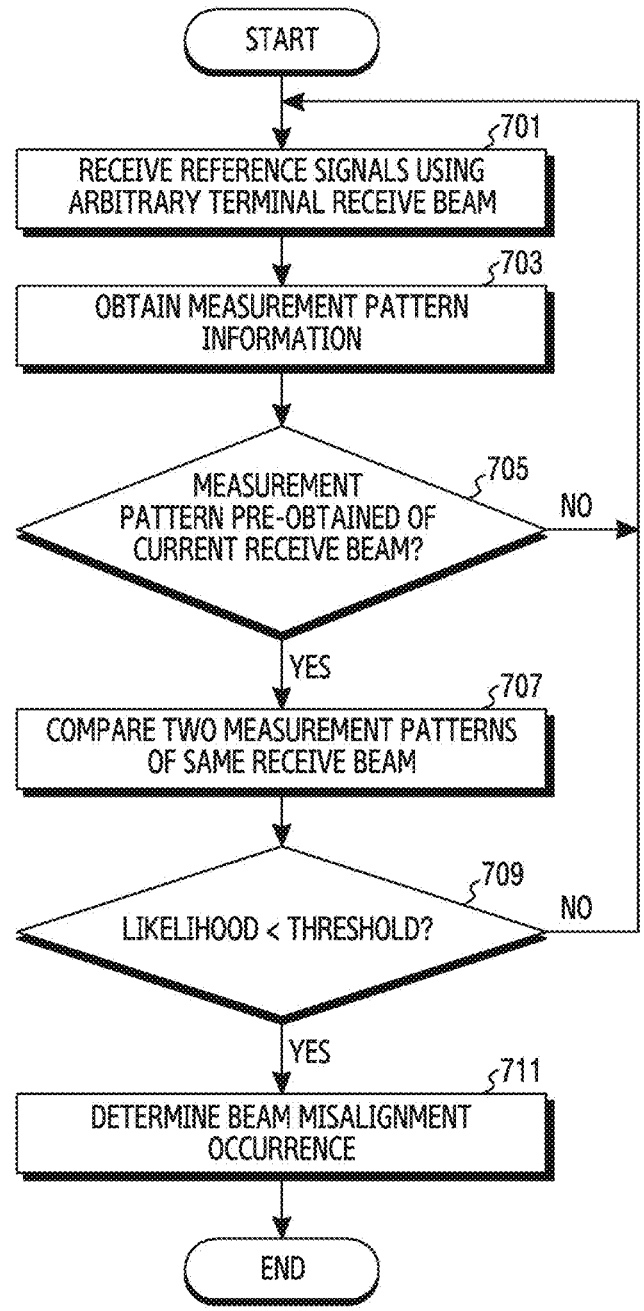
FIG. 7A illustrates an operating method for detecting beam misalignment based on a measurement pattern in a wireless communication system according to various embodiments of the disclosure.

FIG. 7A illustrates an operating method for detecting beam misalignment based on a measurement pattern in a wireless communication system according to various embodiments of the disclosure. FIG. 7A illustrates the operating method of the terminal 120.

Referring to FIG. 7A, in step 701, the terminal receives reference signals using an arbitrary receive beam. In other words, the terminal performs the receive beamforming on the reference signals using the arbitrary receive beam. Within a particular beam full sweep period, the terminal receives the reference signals transmitted from the base station with the arbitrary receiving beam. At this time, the terminal receives all or some of the reference signals transmitted within the full sweep period.

In step 703, the terminal obtains pattern information of the measurement values. That is, the terminal measures the received strength of the reference signals received in step 701, and stores the pattern of the measurement values. Herein, the pattern of the measurement value may be defined as a relative amplitude relationship of the measurement values, that is, as a ratio of the remaining measurement values to one measurement value. Alternatively, the pattern of the measurement values may be defined as the order of the transmit beams sorted in ascending or descending order of the measurement values. At this time, the pattern of the measurement values is determined per receive beam. Hereinafter, the pattern of the measurement values is referred to as a 'measurement pattern'.

In step 705, the terminal determines whether there is a pre-obtained measurement pattern of the current receive beam. In other words, the terminal determines whether other measurement pattern obtained before the measurement pattern obtained in step 703 is stored, for the received beam used in step 701. If the pre-obtained measurement pattern does not exist, the terminal returns to step 701.

By contrast, if the measurement pattern pre-obtained exists, in step 707, the terminal compares two measurement patterns of the same receive beam. That is, the terminal compares the measurement pattern obtained in step 703 with the measurement pattern pre-obtained.

In step 709, the terminal determines whether likelihood between the measurement patterns is less than a threshold. The likelihood may be defined variously according to a specific embodiment. For example, the likelihood may be determined based on at least one of a difference between ratio values for the same transmit beam, and the order of the ratio values which form each measurement pattern.

If the likelihood is less than the threshold, in step 711, the terminal determines occurrence of the beam misalignment. In other words, the terminal determines that the current serving beam is not the best beam. By contrast, if the likelihood is equal to or greater than the threshold, the terminal determines no occurrence of the beam misalignment and returns to step 701.

Figure 7B:
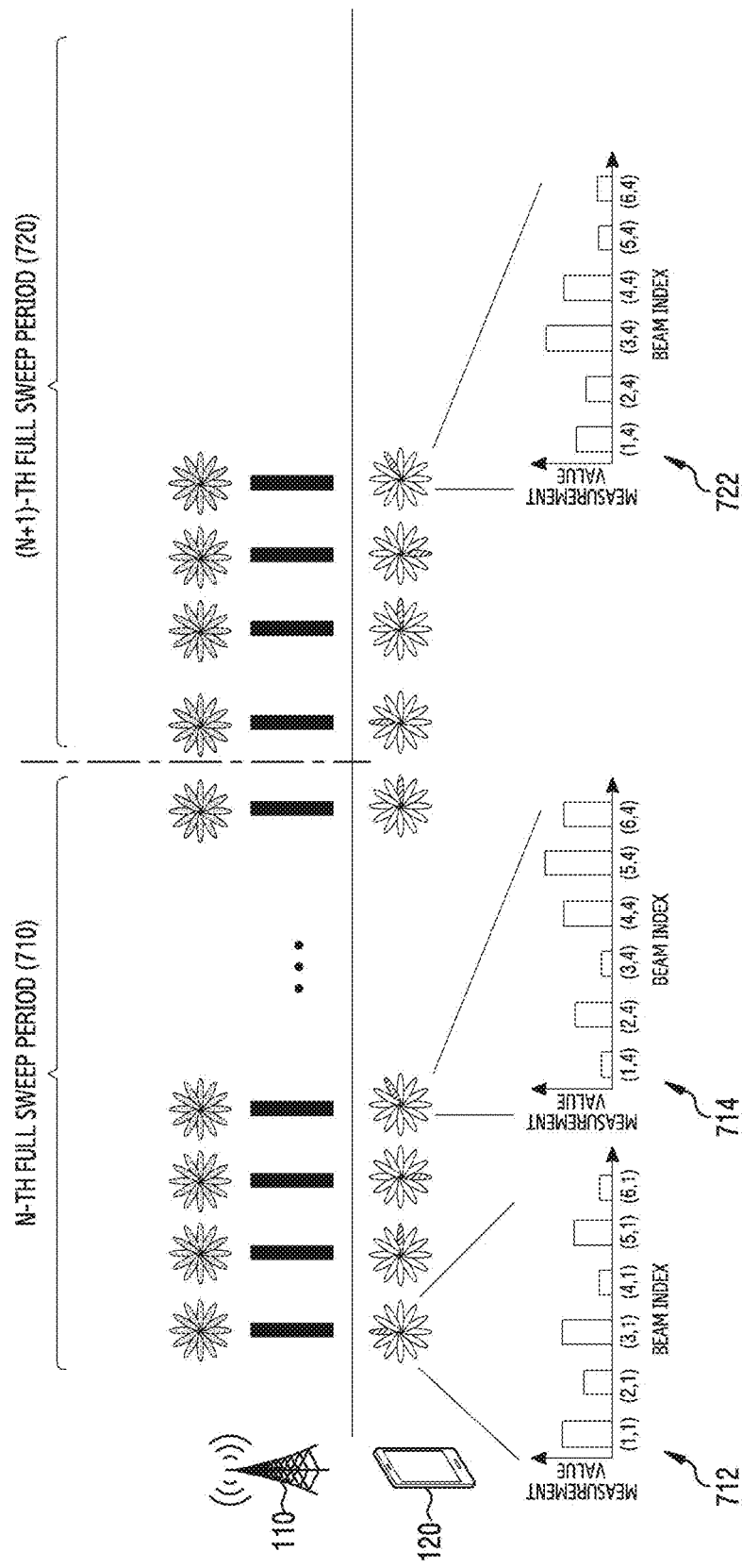
FIG. 7B illustrates an example for the beam misalignment detection based on the measurement pattern in the wireless communication system according to various embodiments of the disclosure.

A specific example of the embodiment described with reference to FIG. 7A is explained by referring to FIG. 7B. FIG. 7B illustrates an example for the beam misalignment detection based on the measurement pattern in the wireless communication system according to various embodiments of the disclosure.

Referring to FIG. 7B, for an n-th full sweep period 710, the base station 110 transmits repeatedly reference signals which are beamformed. At this time, the terminal 120 receives the reference signals using a plurality of receive beams. For the period 710, the terminal 120 acquires a plurality of measurement patterns including a measurement pattern 712 and a measurement pattern 714. Next, for an (n+1)-th full sweep period 720, the base station 110 repeatedly transmits the reference signals beamformed. At this time, the terminal 120 obtains a measurement pattern 722 for at least one receive beam. In so doing, since there is the measurement pattern 714 for the same receive beam as the measurement pattern 722, the terminal 120 compares the measurement pattern 722 and the measurement pattern 714. In the example of FIG. 7B, the measurement pattern 714 and the measurement pattern 722 exhibit different patterns. In this case, the terminal may determine that the likelihood is less than the threshold, and declare the beam misalignment.

According to the embodiment described with reference to FIG. 7A and FIG. 7B, channel degradation not caused by interference or paging, that is, detection of the beam misalignment may be feasible. In addition, since the measurement pattern is used without researching the best beam, whether the beam is misaligned may be determined within a very short time.

In the embodiment of FIG. 7A and FIG. 7B, the terminal declares the beam misalignment because of the change in the measurement pattern. However, according to another embodiment, for more accurate detection of the beam misalignment, the terminal may declare the beam misalignment only if the change of the measurement pattern is repeated for a specific number of times. In this case, even if the number of the transmit beams used by the base station is small, accuracy of the beam misalignment detection may be improved.

In addition, for the more accurate detection of the beam misalignment, the terminal may determine the change of the measurement pattern by stages based on two or more criteria. Hereinafter, by referring to FIG. 8A through FIG. 8E, embodiments for determining the change of the measurement pattern by stages are described.

Figure 8A:
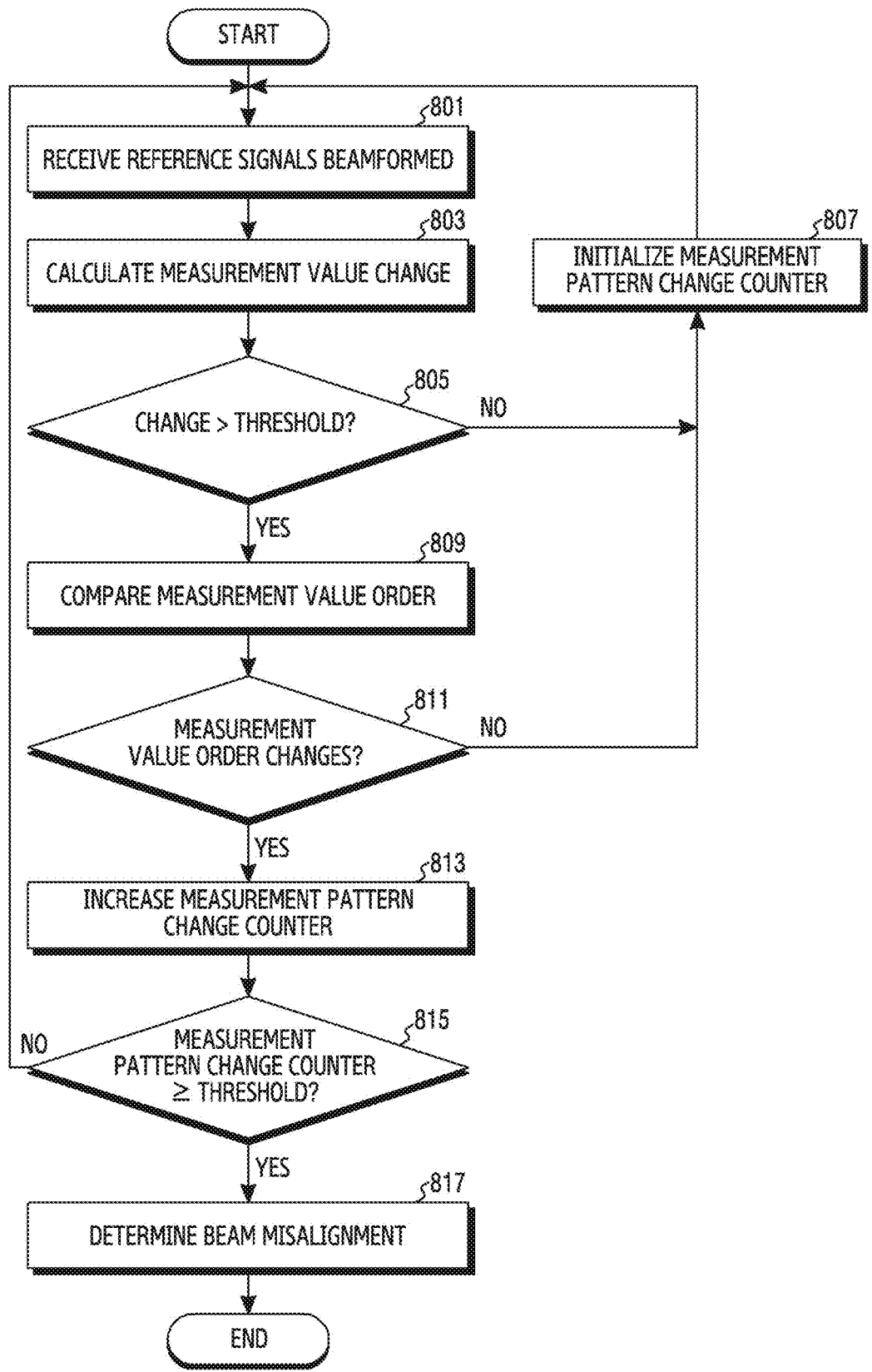
FIG. 8A illustrates an operating method for detecting beam misalignment based on a measurement value order in a wireless communication system according to various embodiments of the disclosure.

FIG. 8A illustrates an operating method for detecting beam misalignment based on an order of measurement values in a wireless communication system according to various embodiments of the disclosure. FIG. 8A illustrates the operating method of the terminal 120.

Referring to FIG. 8A, in step 801, the terminal receives reference signals beamformed. At this time, the terminal performs the receive beamforming using at least one receive beam. In so doing, the terminal has a measurement value set for at least one receive beam before step 801. By using the reference signals received in step 801, the terminal obtains another measurement value set for at least one receive beam. In the following, for the sake of explanations, the disclosure describes based on the sets of measurement values for one receive beam.

Next, in step 803, the terminal calculates a measurement value change. That is, the terminal calculates a difference value between the two sets of measurement values. Herein, the change may be defined variously. For example, the change may be a sum or an average of the difference between the measurement values for each transmit beam. At this time, at least one of the maximum value and the minimum value of the measurement values may be excluded from the sum or average calculation. For example, the change may be determined based on Equation 1.

$$\Delta X_t = |X_t - X_{t-1}| \quad \text{Equation (1)}$$

Optional: removing the Max, Min, deviation from $\Delta X_t$ if $N$ is 8 or more $$\overline{\Delta X_t} = \frac{1}{N-2} \sum^{N-2} \Delta X_t$$

In Equation 1, $\Delta X_t$ denotes a difference between a t-th measurement value and a (t−1)-th measurement value, $X_t$ denotes the t-th measurement value, $\overline{\Delta X_t}$ denotes the average of the measurement value difference, and N denotes the number of the measurement values used for the average determination.

Next, in step 805, the terminal determines whether the change is greater than the threshold. The change greater than the threshold may mean that the measurement pattern may be changed.

If the change is less than or equal to the threshold, in step 807, the terminal initializes a counter for the change of the measurement pattern. The counter for the change of the measurement pattern is a variable for counting how many times the measurement pattern changes. Next, the terminal returns to step 801. Hereinafter, the counter for the change of the measurement pattern is referred to as a 'measurement pattern change counter'.

By contrast, if the change is greater than the threshold, in step 809, the terminal compares the order of the measurement values. Specifically, the terminal arranges the transmit beams in ascending or descending order according to the magnitude of the measurement values included in the two sets of measurement values, and identifies whether the orders of the arranged transmit beams match. That is, in the two measurement value values, the terminal identifies whether the transmit beams the same having the greatest measurement value match, and the transmit beams having the second greatest measurement value match.

Next, in step 811, the terminal identifies whether the order of the measurement values changes. If the order of the measurement values does not change, that is, if the order of measurement values is the same, the terminal initializes the measurement pattern change counter in step 807 and returns to step 801.

By contrast, if the order of the measurement values changes, in step 813, the terminal increases the measurement pattern change counter. That is, the terminal determines the change of the measurement pattern, and records the change count.

Next, in step 815, the terminal determines whether the measurement pattern change counter is greater than or equal to the threshold. That is, to declare the beam misalignment if the measurement pattern changes of a specific count occurs, the terminal compares the measurement pattern change counter with the threshold. Notably, if the threshold is set to 1, the beam misalignment may be declared with only one measurement pattern change. If the measurement pattern change counter is less than the threshold, the terminal initializes the measurement pattern change counter in step 807 and returns to step 801.

By contrast, if the measurement pattern change counter is greater than or equal to the threshold, in step 817, the terminal determines the beam misalignment. That is, the terminal determines that the beam misalignment has occurred.

Figure 8B:
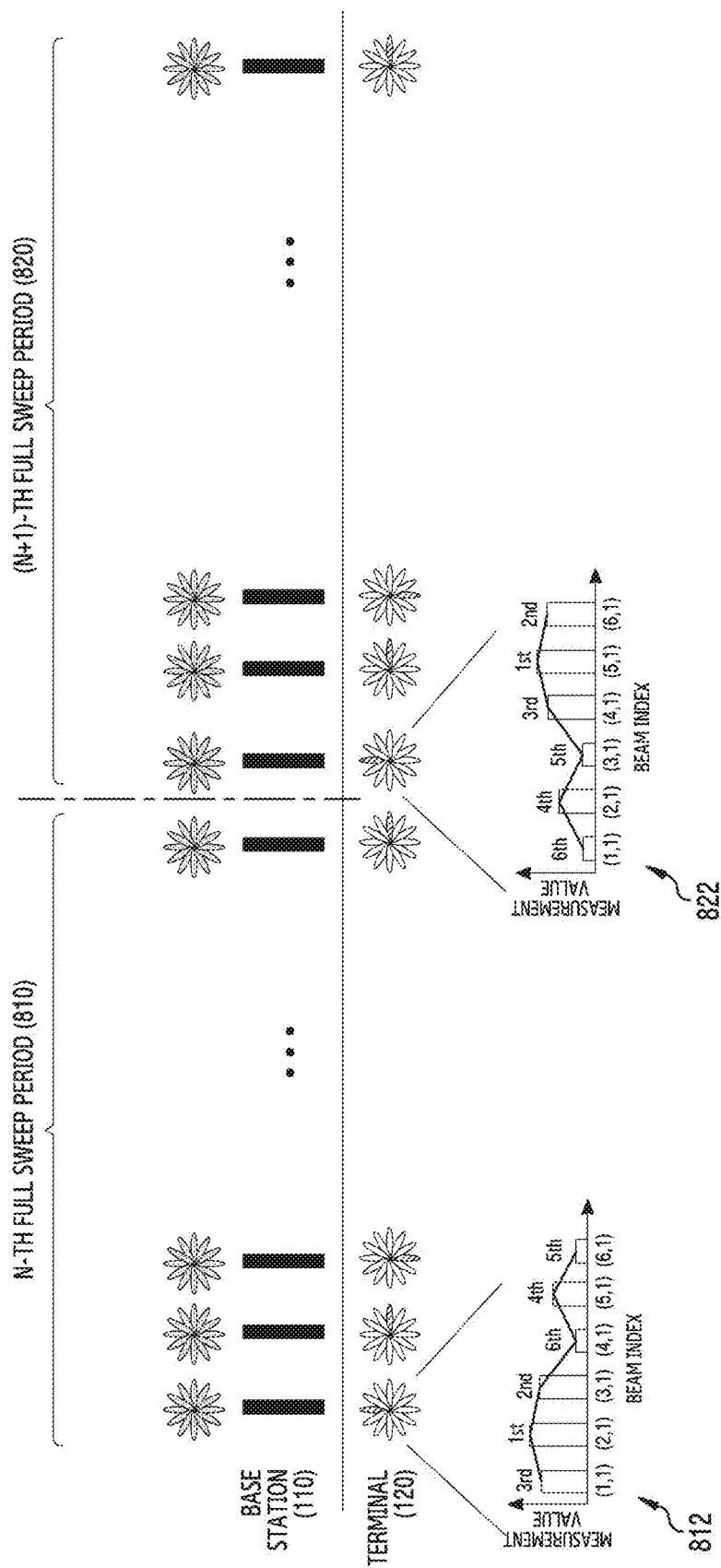
FIG. 8B illustrates an example for the beam misalignment detection based on the measurement value order in the wireless communication system according to various embodiments of the disclosure.

A specific example of the embodiment with FIG. 8B is now described by referring to FIG. 8B. FIG. 8B illustrates the beam misalignment, and FIG. 8C illustrates no beam misalignment.

FIG. 8B illustrates an example for the beam misalignment detection based on the measurement value order in the wireless communication system according to various embodiments of the disclosure. Referring to FIG. 8B, for an n-th full sweep period 810, the base station 110 repeatedly transmits reference signals which are beamformed. At this time, the terminal 120 receives the reference signals using a plurality of receive beams. During the period 810, the terminal 120 acquires a measurement value set 812. Next, for an (n+1)-th full sweep period 820, the base station 110 repeatedly retransmits the reference signals beamformed. At this time, the terminal 120 obtains a measurement value set 822. The measurement value set 812 and the measurement value set 822 exhibit a difference in change. The order of measurement values of the measurement value set 812 is '2-3-1-5-6-4', and the order of measurement values of the measurement value set 822 is '5-6-4-2-3-1', wherein the orders are different. Hence, since the change is greater than the threshold and the orders are different, the misalignment is declared.

Figure 8C:
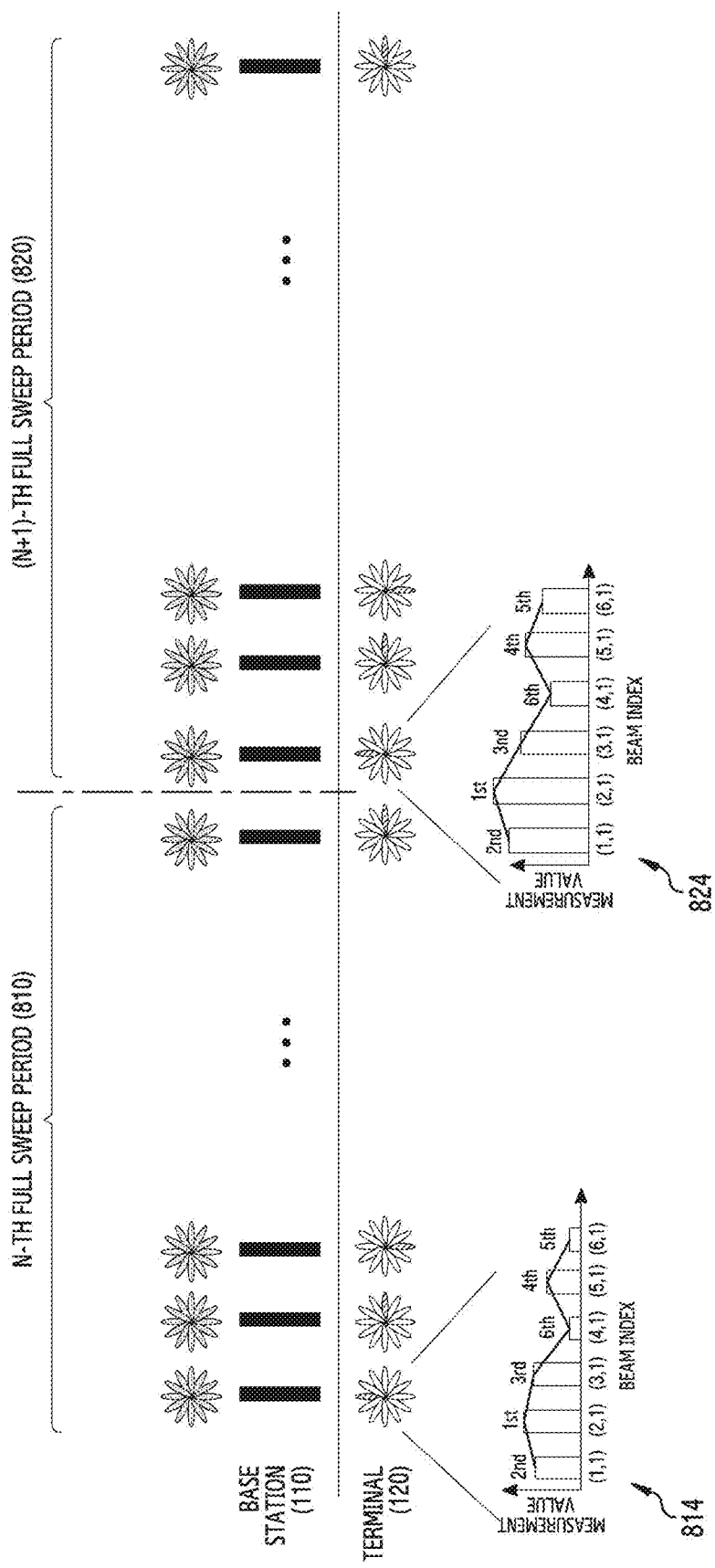
FIG. 8C illustrates another example for the beam misalignment detection based on the measurement value order in the wireless communication system according to various embodiments of the disclosure.

FIG. 8C illustrates another example for the beam misalignment detection based on the measurement value order in the wireless communication system according to various embodiments of the disclosure. Referring to FIG. 8C, for the n-th full sweep period 810, the base station 110 repeatedly transmits reference signals which are beamformed. At this time, the terminal 120 receives the reference signals using a plurality of receive beams. During the period 810, the terminal 120 acquires a measurement value set 814. Next, for the (n+1)-th full sweep period 820, the base station 110 repeatedly retransmits the reference signals beamformed. At this time, the terminal 120 obtains a measurement value set 824. The measurement value set 814 and the measurement value set 824 exhibit a difference in the change. The order of measurement values of the measurement value set 814 is '2-1-3-5-6-4', and the order of measurement values of the measurement value set 824 is '2-1-3-5-6-4', wherein the orders are identical. Hence, while the change is greater than the threshold, that is, the offsets are different, the beam misalignment is not declared due to the same order.

According to the embodiment described with reference to FIG. 8A through FIG. 8C, the beam misalignment may be detected, not caused by interference or paging. Further, through the 2-stage determination in consideration of the measurement values change and the order, implementation and determination accuracy may be secured. Further, as the pattern change counter is adopted, the accuracy may be secured even with small transmit beams of the base station.

In this case, to prevent inaccurate determination of the beam misalignment, it is necessary to consider a measuring error, in determining the order of the measurement values. If relocation or rotation of the terminal does not occur but the measurement value difference between the transmit beams is insignificant, the order may be reversed due to small measurement error or randomness. Thus, to prevent wrong beam misalignment declaration due to the measurement error, an embodiment for adopting grouping of the measurement values is described below with reference to FIG. 8D and FIG. 8E.

Figure 8D:
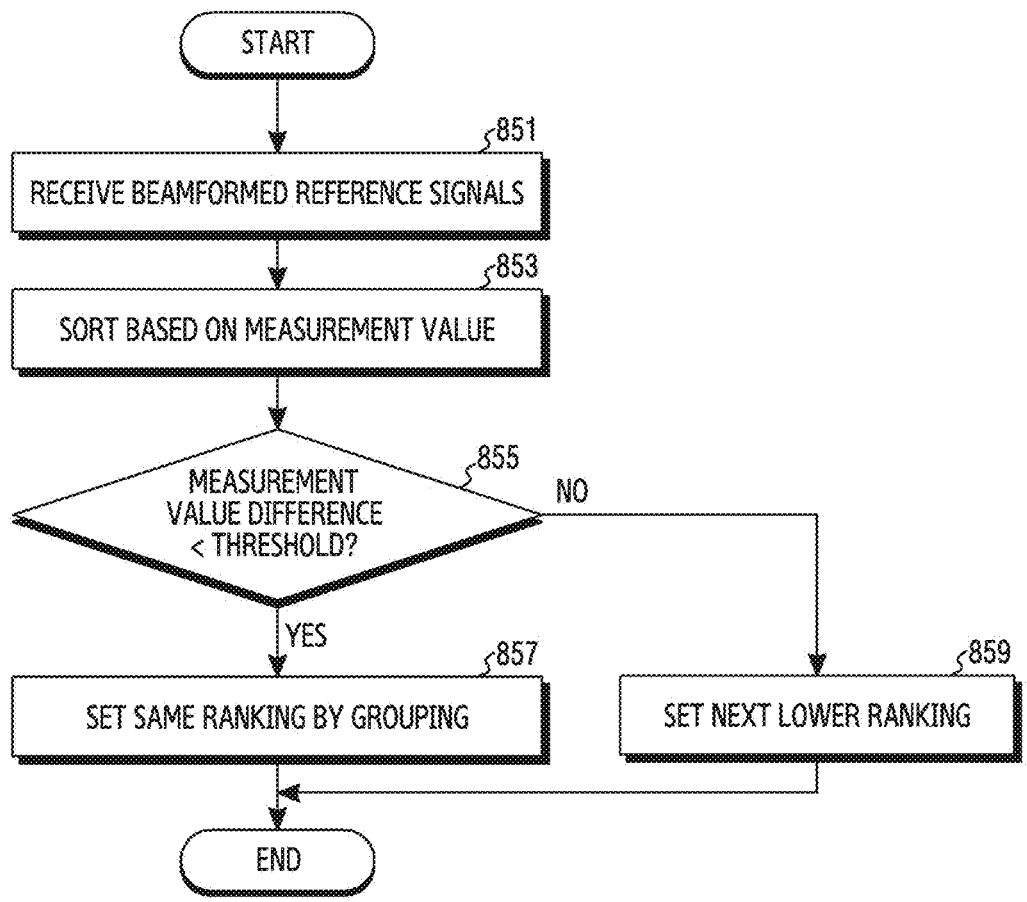
FIG. 8D illustrates an operating method for grouping measurement values in the wireless communication system according to various embodiments of the disclosure.

FIG. 8D illustrates an operating method for grouping the measurement values in the wireless communication system according to various embodiments of the disclosure. FIG. 8D illustrates the operating method of the terminal 120.

Referring to FIG. 8D, in step 851, the terminal receives beamformed reference signals. At this time, the terminal performs the receive beamforming using at least one receive beam. Using the received reference signals, the terminal obtains a different measurement value set for at least one receive beam. In the following, for the sake of descriptions, the disclosure provides explanations based on the sets of measurement values for one receive beam.

Next, in step 853, the terminal sorts transmit beams based on the measurement value. That is, the terminal identifies the transmit beam corresponding to the greatest measurement value, the transmit beam corresponding to the second greatest measurement value, and so on. Hence, the transmit beams are sorted in the order of the measurement value magnitude.

Next, in step 855, the terminal identifies whether a difference of the measurement values is less than the threshold. That is, with respect to each of transmit beam pairs having adjacent orders, among the sorted transmit beams, the terminal identifies whether the difference of the measurement values is less than the threshold. Herein, the threshold may be tuned based on the measurement error or the randomness for the reference signal.

If the difference of the measurement values is less than the threshold, in step 857, the terminal sets the same ranking by grouping the corresponding transmit beam pair. In so doing, three or more transmit beams may be set to the same ranking, based on the difference of the measurement value of the transmit beam of a next ranking.

If the difference of the measurement values is greater than or equal to the threshold, in step 859, the terminal sets a next lower ranking. That is, the terminal sets two transmit beams of the corresponding transmit beam pair to different rankings.

Figure 8E:
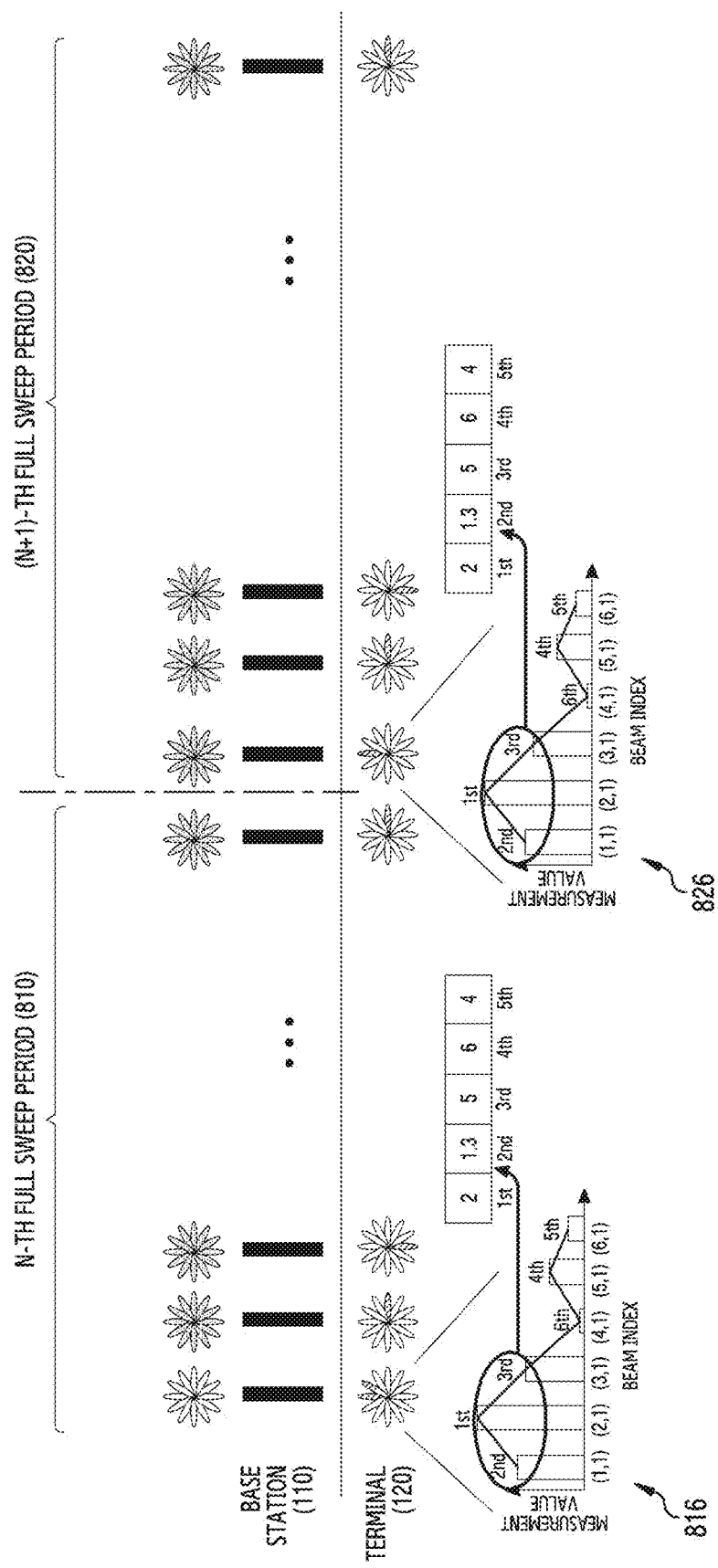
FIG. 8E illustrates an example of the beam misalignment detection based on order of measurement value groups in the wireless communication system according to various embodiments of the disclosure.

A specific example of the beam misalignment determination according to the embodiment described in FIG. 8D is now explained by referring to FIG. 8E. FIG. 8E illustrates an example of the beam misalignment detection based on an order of measurement value groups in the wireless communication system according to various embodiments of the disclosure.

Referring to FIG. 8D, for the n-th full sweep period 810, the base station 110 repeatedly transmits reference signals which are beamformed. At this time, the terminal 120 receives the reference signals using a plurality of receive beams. During the period 810, the terminal 120 acquires a measurement value set 816. Next, for the (n+1)-th full sweep period 820, the base station 110 repeatedly retransmits the reference signals beamformed. At this time, the terminal 120 obtains a measurement value set 826. The measurement value set 816 and the measurement value set 826 exhibit a difference in the change. The order of measurement values of the measurement value set 816 is '2-1-3-5-6-4', and the order of measurement values of the measurement value set 826 is '2-3-1-5-6-4', wherein the orders are different from each other. However, since the difference of the measurement values of the transmit beam #1 and the transmit beam #3 are less than the threshold, the transmit beam #1 and the transmit beam #3 are grouped and thus have the same ranking. In this case, the order difference of the '1-3' and '3-1' does not affect determining the measurement pattern change. Thus, the beam misalignment is not declared. As a result, the incorrect determination of the beam misalignment due to the reversed order caused by the measurement error or the randomness may be prevented.

Figure 9:
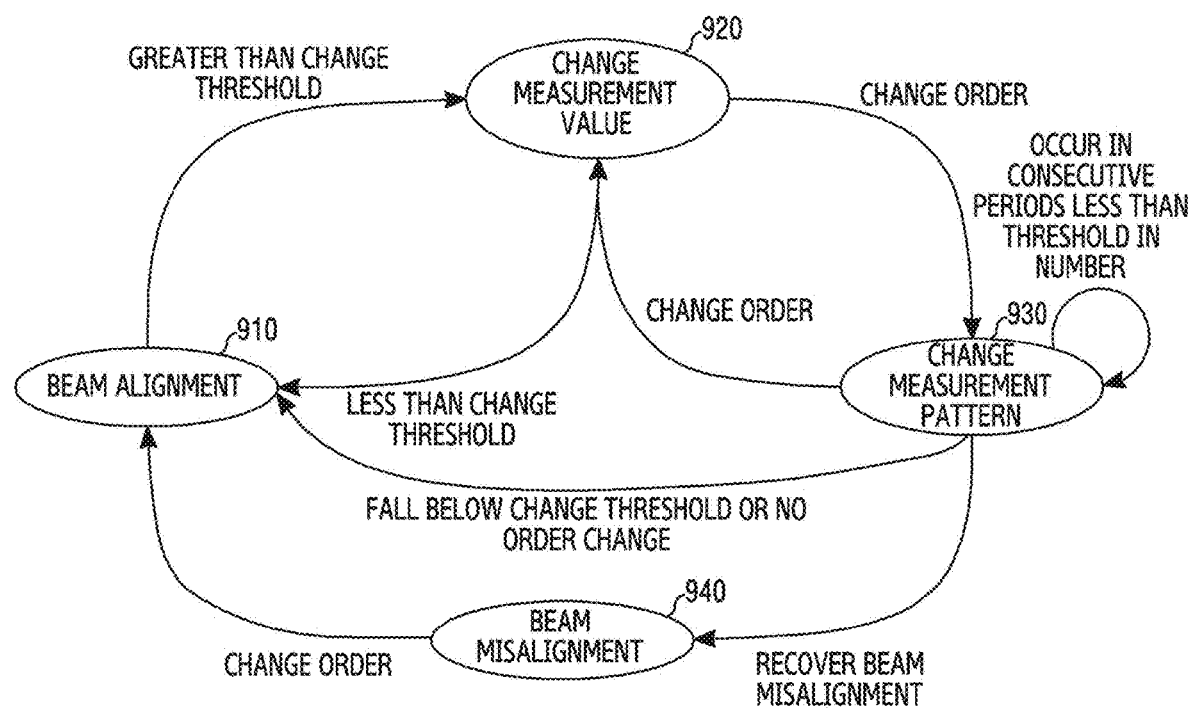
FIG. 9 illustrates a state transition diagram regarding beam misalignment in a wireless communication system according to various embodiments of the disclosure.

FIG. 9 illustrates a state transition diagram regarding beam misalignment in a wireless communication system according to various embodiments of the disclosure. FIG. 9 illustrates the state transition diagram of the beam misalignment determination procedure which adopts the 2-stage measurement pattern change in consideration of the change and the order.

Referring to FIG. 9, an initial state is in a beam aligned state 910. If the change of the measurement values is greater than the threshold, the state transits to a measurement value changed state 920. In the measurement value changed state 920, if the order change is determined, the state transits to a measurement pattern changed state 930. At this time, even if the measurement pattern change occurs in consecutive periods less than the threshold number, the measurement pattern changed state 930 is maintained. Within the consecutive periods less than the threshold number, if no order change is determined, the state switches to the measurement value changed 920. In addition, within the consecutive periods less than the threshold number, if the change falls below the threshold or no order change is determined, the state transits to the beam aligned state 910. If the measurement pattern change occurs in consecutive periods over the threshold number in the measurement pattern changed state 930, the state transits to a beam misaligned state 940. In the beam misaligned state 940, if the beam misalignment is recovered, the state returns to the beam aligned state 910.

According to the above-stated various embodiments, the beam misalignment may be detected. The determination result of the beam misalignment may be utilized variously. According to one embodiment, the determination of the beam misalignment may be utilized for power control of a receiving unit of the terminal 120. Specifically, the determination of the beam misalignment may be used for the power control during the operation in a discontinuous reception (DRX) mode. Herein, the DRX mode is an operation mod which temporarily deactivates all or part of a receiving circuit by controlling hardware of a physical layer through turn off, sleep, and so on while maintaining a connected state, that is, an active state in an upper layer (e.g., radio resource control (RRC) layer).

If operating in the DRX mode, an on duration and a sleep duration are repeated according to a DRX cycle or a DRX period. At this time, the terminal 120 receives a signal transmitted from the base station 110 by activating the receiving circuit in the on duration, and deactivates the receiving circuit in the sleep duration. Herein, the activation may be referred to as wake up, and the deactivation may be referred to as sleep. In a system which performs communication on the assumption of the beamforming, in the DRX duration, the terminal 120 transmits a feedback regarding a preferred beam to the base station 110 at least once. In the on duration, the base station 110 may transmit downlink scheduling information.

At this time, even if activated in the on duration but the beam is not aligned, the terminal may not receive the signal. Accordingly, before sufficient time (e.g., time taken for the beam search) for the on duration to arrive, the terminal should activate the receiving circuit and then perform the beam search. However, the beam used in a previous on period is not always invalid. Hence, the terminal which activates the receiving circuit before the sufficient time for the on duration to arrive may control a subsequent operation state according to determining whether the beam is misaligned. Thus, the disclosure describes an embodiment of controlling the receiving circuit according to the result of the beam misalignment detection during the operation in the DRX mode by referring to FIG. 10A, FIG. 10B, and FIG. 10C.

Figure 10A:
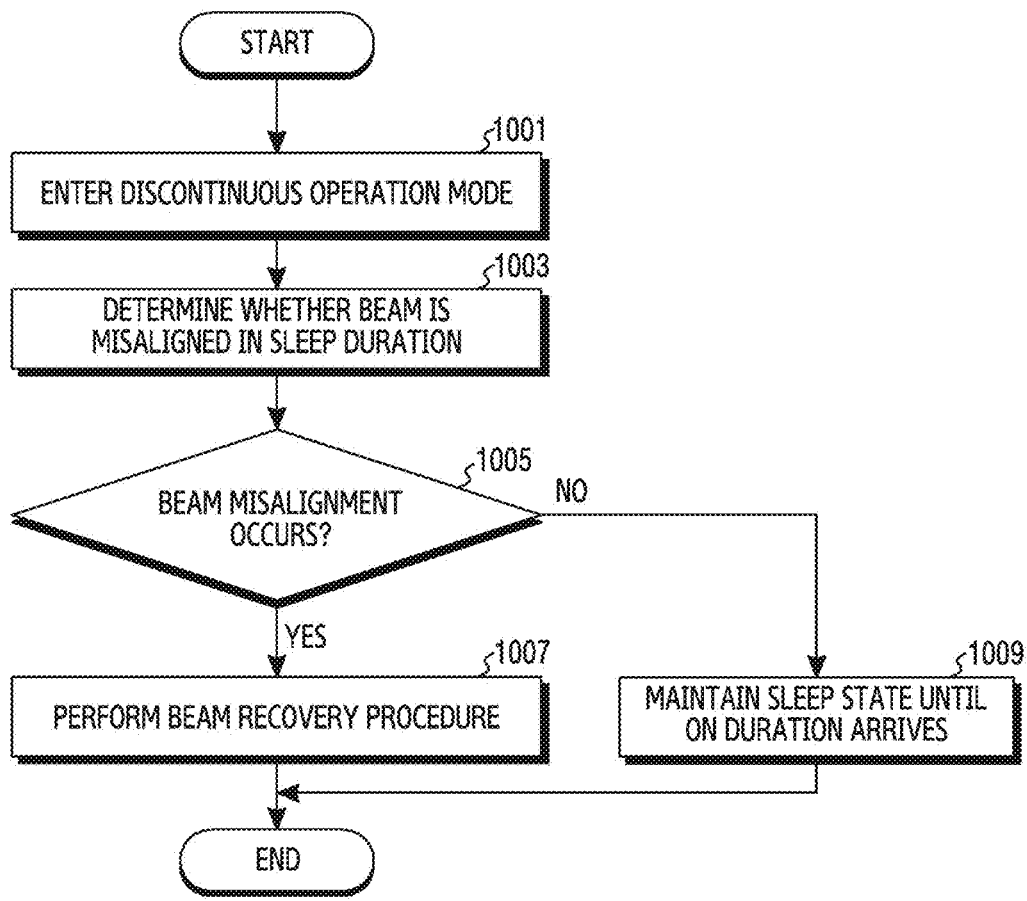
FIG. 10A illustrates an operating method for power control based on beam misalignment detection in a wireless communication system according to various embodiments of the disclosure.

FIG. 10A illustrates an operating method for power control based on beam misalignment detection in a wireless communication system according to various embodiments of the disclosure. FIG. 10A illustrates the operating method of the terminal 120.

Referring to FIG. 10A, in step 1001, the terminal enters a discontinuous operation mode (e.g., the DRX mode). The DRX mode is entered under control of the base station. That is, the terminal receives a message directing to enter the DRX mode from the base station. Hence, the terminal operates the on duration and the sleep duration according to the DRX cycle. For the sleep duration, the terminal may deactivate whole or part of the receiving circuit.

In step 1003, the terminal determines whether the beam is misaligned in the sleep duration. According to one embodiment, the terminal may perform the beam measurement. That is, the terminal may temporarily activate the receiving circuit in the sleep interval, and receive beamformed reference signals transmitted from the base station. That is, the terminal determines whether the beam misalignment occurs or not, by comparing new measurement values with measurement values obtained from a previous on duration or before the DRX mode entry. For example, the terminal may determine whether the beam is misaligned according to one of the various embodiments described above. According to another embodiment, the terminal may determine whether the beam is misaligned by using a sensor of the terminal. To determine whether the beam is misaligned using the sensor, the terminal identifies whether the terminal rotates or relocates after a previous beam search. In so doing, the time for determining whether the beam is misaligned precedes a specific time before the on duration, and the specific time is greater than or equal to the time taken to carry out the beam recovery, that is, the time required to realign the beam.

Next, in step 1005, the terminal identifies whether the beam misalignment occurs. If the beam misalignment occurs, in step 1007, the terminal performs the beam recovery procedure. The beam recovery procedure may be performed in various ways according to a particular embodiment. For example, as the beam recovery procedure, the terminal may perform the beam search procedure. Alternatively, the terminal may perform the beam recovery procedure according to various embodiments described below.

By contrast, if determining no beam misalignment occurrence, in step 1009, the terminal maintains the sleep state until the on duration arrives. Herein, before the on duration indicates a timing considering the time necessary for normalizing the receiving circuit. That is, because the beam is aligned without the beam misalignment, an additional beam recovery procedure is not required. Thus, the terminal may reduce power consumption, by maintaining the receiving circuit in the deactivated state for the remaining sleep duration.

Figure 10B:
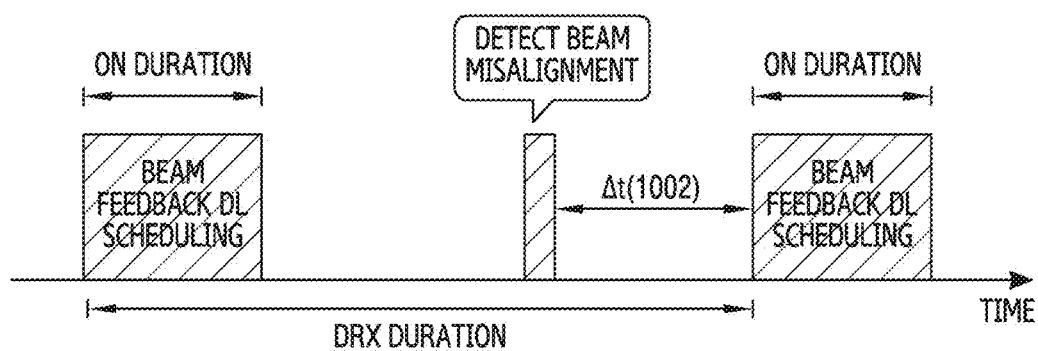
FIG. 10B and FIG. 10C illustrate examples of the power control based on the beam misalignment detection in the wireless communication system according to various embodiments of the disclosure.
Figure 10C:
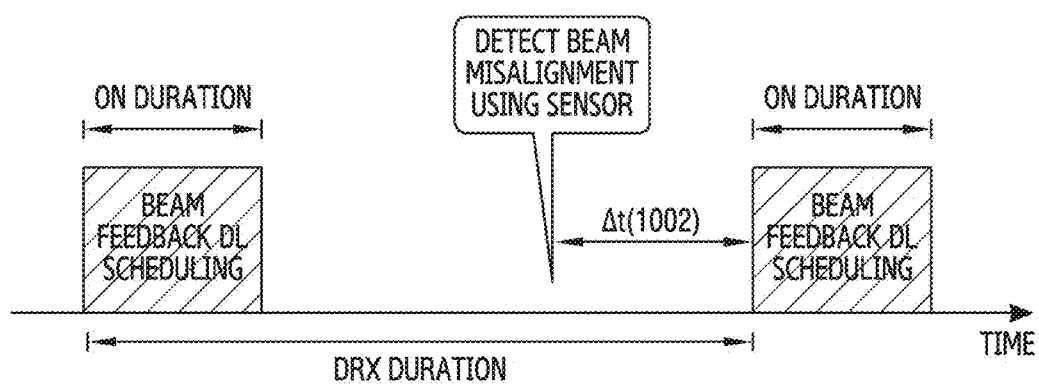

A specific example of the embodiment described with FIG. 10A is now explained by referring to FIG. 7B. FIG. 10B and FIG. 10C illustrate examples of the power control based on the beam misalignment detection in the wireless communication system according to various embodiments of the disclosure.

FIG. 10B illustrates the case of determining whether the beam is misaligned based on the beam measurement. Referring to FIG. 10B, if the on duration ends, the terminal 120 enters the sleep duration and deactivates the receiving circuit. At this time, before a time 1002 of Δt from a next on duration, the terminal temporarily activates the receiving circuit and detects the beam misalignment. Depending on the detection result of the beam misalignment, the operation state of the receiving circuit of the duration of the time 1002 may change.

FIG. 10C illustrates the case of determining whether the beam is misaligned based on the sensor value. Referring to FIG. 10C, if the on duration ends, the terminal 120 enters the sleep duration and deactivates the receiving circuit. At this time, before the time 1002 of Δt from the next on duration, the terminal detects the beam misalignment using the sensor value. Depending on the detection result of the beam misalignment, the operation state of the receiving circuit of the duration of the time 1002 may change. If using the sensor as shown in FIG. 10C, since the temporary activation of the receiving circuit is not required, the sleep state may be maintained longer.

In the examples of FIG. 10B and FIG. 10C, if the beam misalignment occurs, the terminal 120 performs the beam recovery procedure. The beam recovery procedure may include measurement on the beams, to be described. However, in some embodiments, the beam may be recovered based on a past beam measurement result or sensor value, without the measurement on the beams. If the beam may be recovered without the beam measurement, the terminal 120 detecting the beam misalignment may recover the beam and then maintain the sleep state. According to yet another embodiment, if the beam recovery procedure based on the beam measurement is conducted, if the beam recovery is completed before the on duration arrives, the terminal 120 may maintain the sleep state for the remaining sleep duration.

According to the embodiment described with reference to FIG. 10A and FIG. 10B, the sleep duration for deactivating the receiving circuit during the DRX mode may be used more effectively. That is, according to the fast beam misalignment determination, the terminal may secure the longer sleep duration. At this time, if determining the occurrence of the beam misalignment, the terminal performs the beam recovery procedure for the rest of the sleep duration. Hereinafter, the disclosure describes various embodiments for the beam recovery.

Figure 11A:
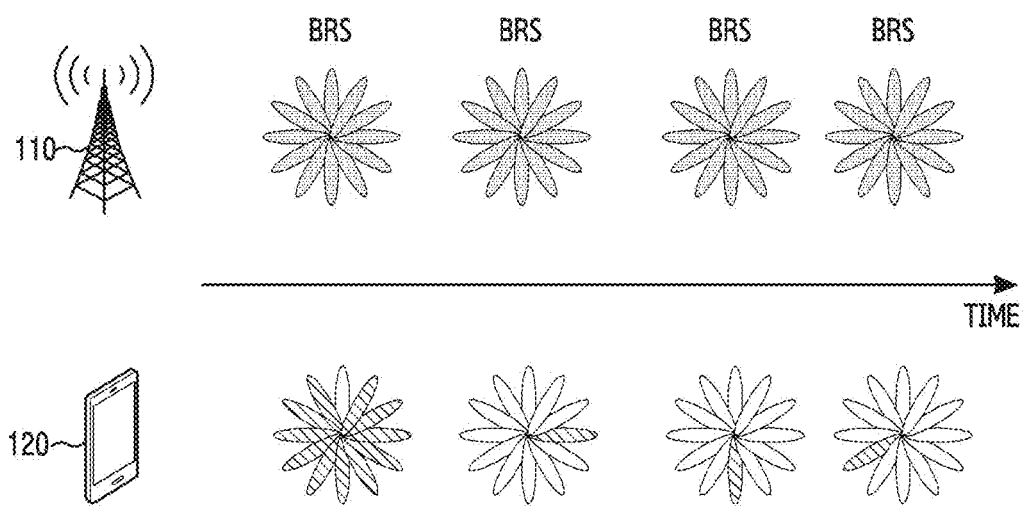
FIG. 11A and FIG. 11B illustrate reference signal transmission schemes supported in a wireless communication system according to various embodiments of the disclosure.
Figure 11B:
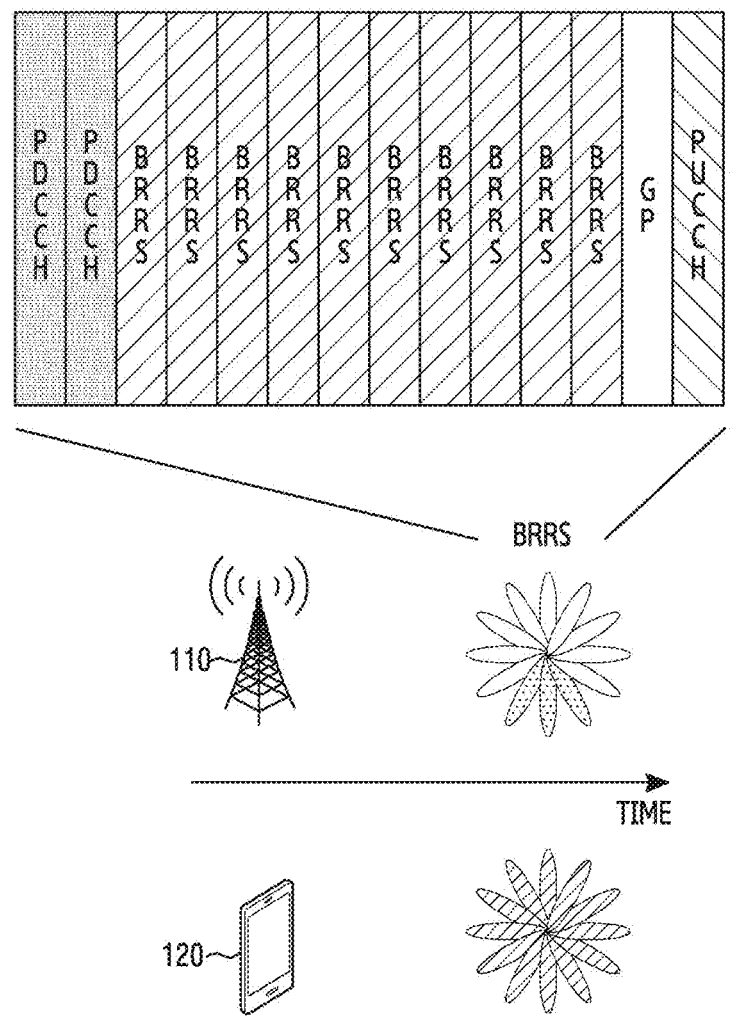

The base station 110 according to various embodiments sweeps reference signals on a periodic basis or on an event basis for the beam search of the terminal 120. In so doing, the base station 110 may support at least two or more reference signal transmission schemes. For example, the reference signal transmission schemes are shown in FIG. 11A and FIG. 11B. FIG. 11A and FIG. 11B depict the reference signal transmission schemes supported by the wireless communication system according to various embodiments of the disclosure.

FIG. 11A illustrates the reference signal transmission scheme for the beam search of a plurality of terminals including the terminal 120. Referring to FIG. 11A, the base station 110 sweeps all of transmit beams of the base station 110, and the sweep of all the transmission beam is repeatedly performed. In this case, the reference signal may be referred to as a 'beam reference signal (BRS)'. Accordingly, the terminal 120 may perform the measurement on every combination of the transmit beam and the receive beam, by receiving the reference signals using different receive beams, for each sweep. The reference signal transmission of FIG. 11A may be performed periodically.

FIG. 11B illustrates the reference signal transmission scheme for the beam search of a specific terminal (e.g., terminal 120). Referring to FIG. 11B, the base station 110 transmits reference signals for the terminal 120 for a specific time duration (e.g., subframe). In this case, the reference signal may be referred to as a 'beam refinement reference signal (BRRS)'. A downlink duration within the time duration is allocated all for the reference signal except for a control channel (e.g., physical downlink control channel (PDCCH)). Herein, the reference signal may be repeated multiple times (e.g., four times) within one symbol. At this time, the base station 110 may sweep all the transmit beams, or sweep only some transmit beams. The reference signal transmission of FIG. 11B may be carried out at a request of the terminal 120.

As described with reference to FIG. 11A and FIG. 11B, two or more reference signal transmission schemes may be supported. The scheme of FIG. 11A may be performed on a plurality of terminals, but takes the longer time. By contrast, the scheme of FIG. 11B may be performed within a short time, but no data may be transmitted for a corresponding time duration. Hence, using the detection of the beam misalignment, the above-stated two reference signal transmission schemes may be operated as shown in FIG. 11C.

Figure 11C:
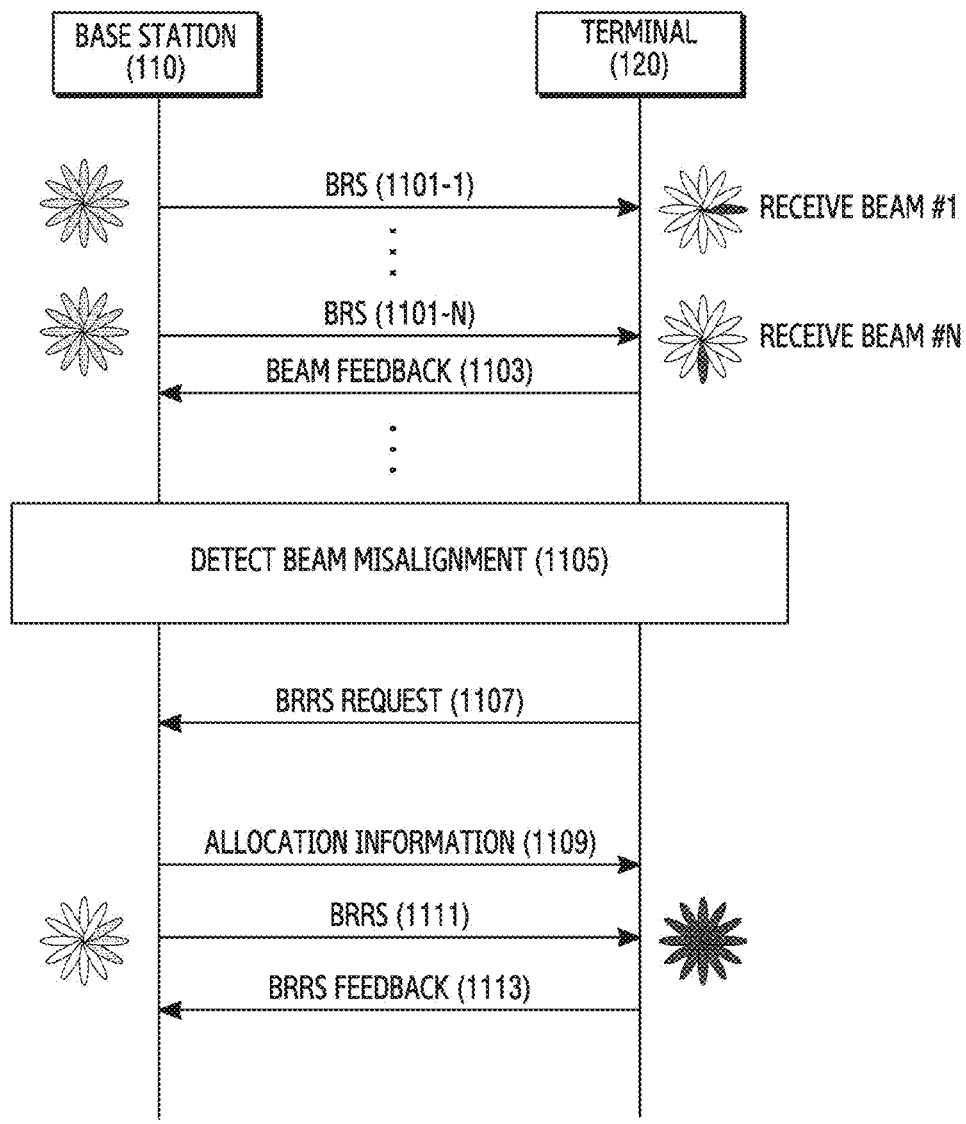
FIG. 11C illustrates signal exchanges for a beam recovery procedure using intensive reference signal transmission in the wireless communication system according to various embodiments of the disclosure.

FIG. 11C illustrates signal exchanges for the beam recovery procedure using intensive reference signal transmission in the wireless communication system according to various embodiments of the disclosure. FIG. 11C illustrates the signal exchanges between the base station 110 and terminal 120.

Referring to FIG. 11C, in step 1101-1 through step 1101-N, the base station 110 transmits reference signals. The reference signals are swept N times, and are transmitted through at least one subframes. In so doing, the terminal 120 performs the receive beamforming by using at least one receive beam for each sweep. Hence, the terminal 120 may select the best beam as a serving beam. Herein, the serving beam includes a serving transmit beam of the base station 110 and a serving receive beam of the terminal 120.

In step 1103, the terminal 120 transmits a beam feedback notifying the serving beam to the base station 110. Herein, the beam feedback may indicate the serving transmit beam of the base station 110. The beam feedback includes identification information of the serving transmit beam, and the identification information may be referred to as a 'beam selection index (BSI).

In step 1105, the terminal 120 detects the beam misalignment. The terminal 120 may perform the measurement on at least one received beam, compare measurement values with previously acquired measurement values, and then detect the beam misalignment based on comparison results. For example, terminal 120 may detect the beam misalignment according to one of the various embodiments described above. Accordingly, the beam recovery procedure proceeds as follows.

In step 1107, the terminal 120 transmits a BRRS request to the base station 110. In other words, as determining the occurrence of the beam misalignment, the terminal 120 transmits to the base station 120 the message requesting to transmit particular reference signals to the terminal 120. That is, the terminal 120 triggers the beam recovery procedure. Accordingly, in step 1109, the base station 110 transmits BRRS allocation information. Next, in step 1111, the base station 110 repeatedly transmits reference signals, that is, BRRSs. Hence, the terminal 120 may re-determine the best beam. Next, in step 1113, the terminal 120 transmits a BRRS feedback notifying the serving beam to the base station 110.

According to the embodiment described with reference to FIG. 11A through FIG. 11C, the beam misalignment situation may be addressed. Specifically, for the beam misalignment, the beam recovery may be carried out, by the intensive reference signal transmission on the terminal. That is, the detection of the beam misalignment may be used as the condition of the intensive reference signal transmission such as BRRS.

The reference signal transmission scheme as shown in FIG. 11B requires the shorter time than the scheme of FIG. 11A, but the time for transmitting the repetitive reference signals for the measurement is still required. Accordingly, a procedure for recovering the beam within a shorter time is explained by referring to FIG. 12A through FIG. 12C.

Figure 12A:
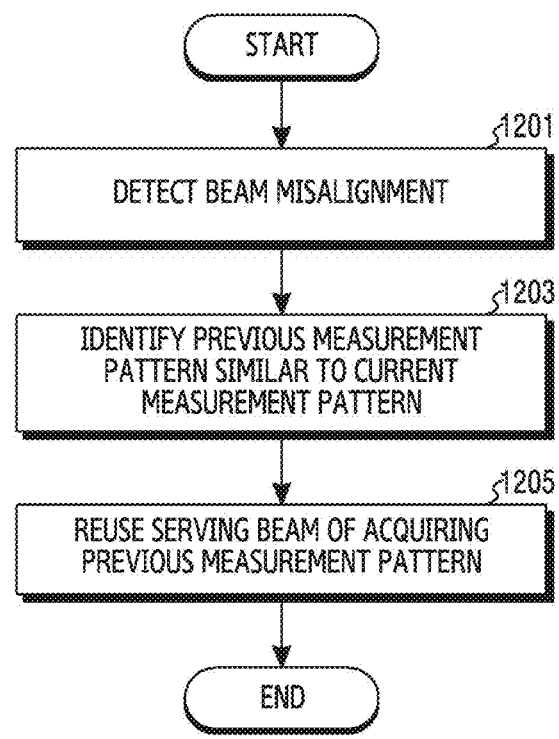
FIG. 12A illustrates an operating method for recovering a beam using previous measurement results in a wireless communication system according to various embodiments of the disclosure.

FIG. 12A illustrates an operating method for recovering a beam using previous measurement results in a wireless communication system according to various embodiments of the disclosure. FIG. 12A illustrates the operating method of the terminal 120.

Referring to FIG. 12A, in step 1201, the terminal detects beam misalignment. The terminal may perform measurement on at least one receive beam, compare measurement values with measurement values previously acquired, and then detect the beam misalignment based on comparison results. For example, the terminal may detect the beam misalignment according to one of the various embodiments as mentioned above.

Next, in step 1203, the terminal identifies a previous measurement pattern similar to a current measurement pattern. That is, the terminal identifies the past measurement pattern which is similar to the measurement pattern obtained in determining the beam misalignment of step 1201, that is, which may not declare the beam misalignment in comparing with the current measurement pattern. That is, the terminal may store and search information regarding past measurement patterns.

Next, in step 1205, the terminal reuses a serving beam of acquiring the previous measurement pattern identified. If the measurement pattern is similar, the same best beam may be expected. Accordingly, the terminal sets the serving beam of the similar measurement pattern to the current measurement pattern as a current serving beam. Herein, the serving beam of acquiring the previous measurement pattern may be a beam selected based on a measurement result corresponding to the previous measurement pattern, or a beam selected through the beam recovery after the beam misalignment is determined by the previous measurement pattern. At this time, according to another embodiment, the terminal may determine whether the use of the previous serving beam is still valid. For example, the terminal may determine the validity based on a time elapsed from the acquisition of the previous measurement pattern.

According to the embodiment described with reference to FIG. 12A, the beam may be recovered without additional beam search. However, the previous measurement pattern similar to the current measurement pattern may not exist. Thus, according to another embodiment, as shown in FIG. 12B, the additional beam search may be considered together.

Figure 12B:
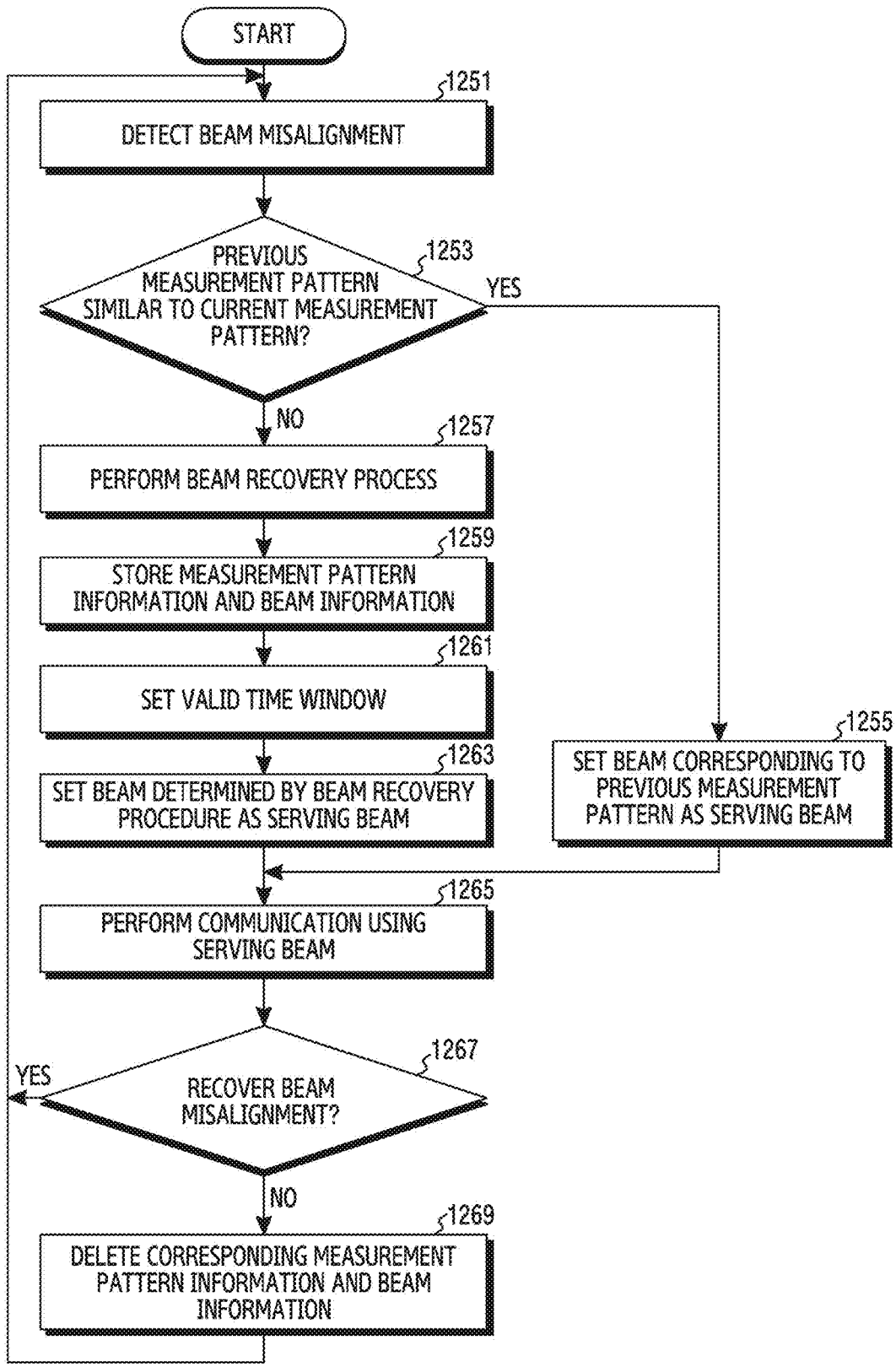
FIG. 12B illustrates an operating method for recovering the beam using the previous measurement results or using the new measurement in the wireless communication system according to various embodiments of the disclosure.

FIG. 12B illustrates an operating method for recovering the beam using the previous measurement results or using new measurement in the wireless communication system according to various embodiments of the disclosure. FIG. 12B illustrates the operating method of the terminal 120.

Referring to FIG. 12B, in step 1251, the terminal detects the beam misalignment. The terminal may perform the measurement on at least one receive beam, compare measurement values with measurement values previously acquired, and then detect the beam misalignment based on comparison results. For example, the terminal may detect the beam misalignment according to one of the various embodiments as mentioned above.

In step 1253, the terminal identifies whether there is a previous measurement pattern similar to a current measurement pattern. That is, the terminal identifies the past measurement pattern which is similar to the measurement pattern obtained in determining the beam misalignment, that is, which may not declare the beam misalignment in comparing with the current measurement pattern. That is, the terminal may store the information regarding the past measurement patterns and corresponding beams, and search using the measurement pattern.

If there is the previous measurement pattern similar to the current measurement pattern, in step 1255, the terminal sets the beam corresponding to the previous measurement pattern as the serving beam. If the measurement pattern is similar, the same best beam may be expected. Hence, without additional beam search, the terminal reuses the serving beam of the similar measurement pattern to the current measurement pattern. In other words, the terminal sets the serving beam determined in acquiring the previous measurement pattern as the current serving beam.

If there is no previous measurement pattern similar to the current measurement pattern, in step 1257, the terminal performs the beam recovery process based on the beam search. For doing so, the terminal may request the base station to transmit reference signals. For example, the terminal may perform the beam recovery procedure according to the embodiment described with reference to FIG. 11C.

In step 1259, the terminal stores measurement pattern information and beam information. That is, the terminal stores the measurement results obtained in step 1257. The stored measurement results may be used for subsequent beam misalignment detection. In addition, the stored measurement results may be used to restore the beam if the beam misalignment occurs later.

In step 1261, the terminal sets a valid time window. Selecting the serving beam by the likelihood of the measurement pattern is possible on the assumption of likelihood in position of the terminal. Hence, if the terminal moves and its relative position for the base station is changed, even the beam corresponding to the same or similar measurement pattern may not be the best beam. Thus, the validity of the past measurement record is limited, and a validity duration is managed through the valid time window. In this case, the valid time window may be defined as a fixed value, or may be dynamically tuned based on an environment (e.g., the movement speed) of the terminal.

Next, in step 1263, the terminal sets the beam determined by the beam recovery procedure as the serving beam. That is, the terminal sets the best beam selected in step 1257 as the serving beam. Additionally, the terminal may transmit feedback information indicating a serving transmit beam of the base station.

In step 1265, the terminal performs communication by using the serving beam. Specifically, the terminal receives a data signal transmitted from the base station using the serving receive beam. Herein, the reception of the data signal includes decrypting and decoding.

In step 1267, the terminal determines whether the beam misalignment is recovered. In other words, the terminal determines whether the serving beam set in step 1255 or step 1261 is the best beam, that is, provides sufficient channel quality for the communication. Whether the beam misalignment is recovered may be determined variously. For example, the terminal may determine whether the beam misalignment is recovered based on whether decoding of the received data signal is successful. If the beam misalignment is recovered, the terminal returns to step 1251.

By contrast, if the beam misalignment is not recovered, in step 1269, the terminal deletes corresponding measurement pattern information and beam information. That is, no recovery of the beam misalignment even though the serving beam set in step 1255 or step 1261 is set indicates no reliability of the corresponding measurement result. Thus, since the corresponding measurement result may not be used for subsequent beam misalignment determination or recovery, the terminal discards the corresponding measurement result.

Figure 12C:
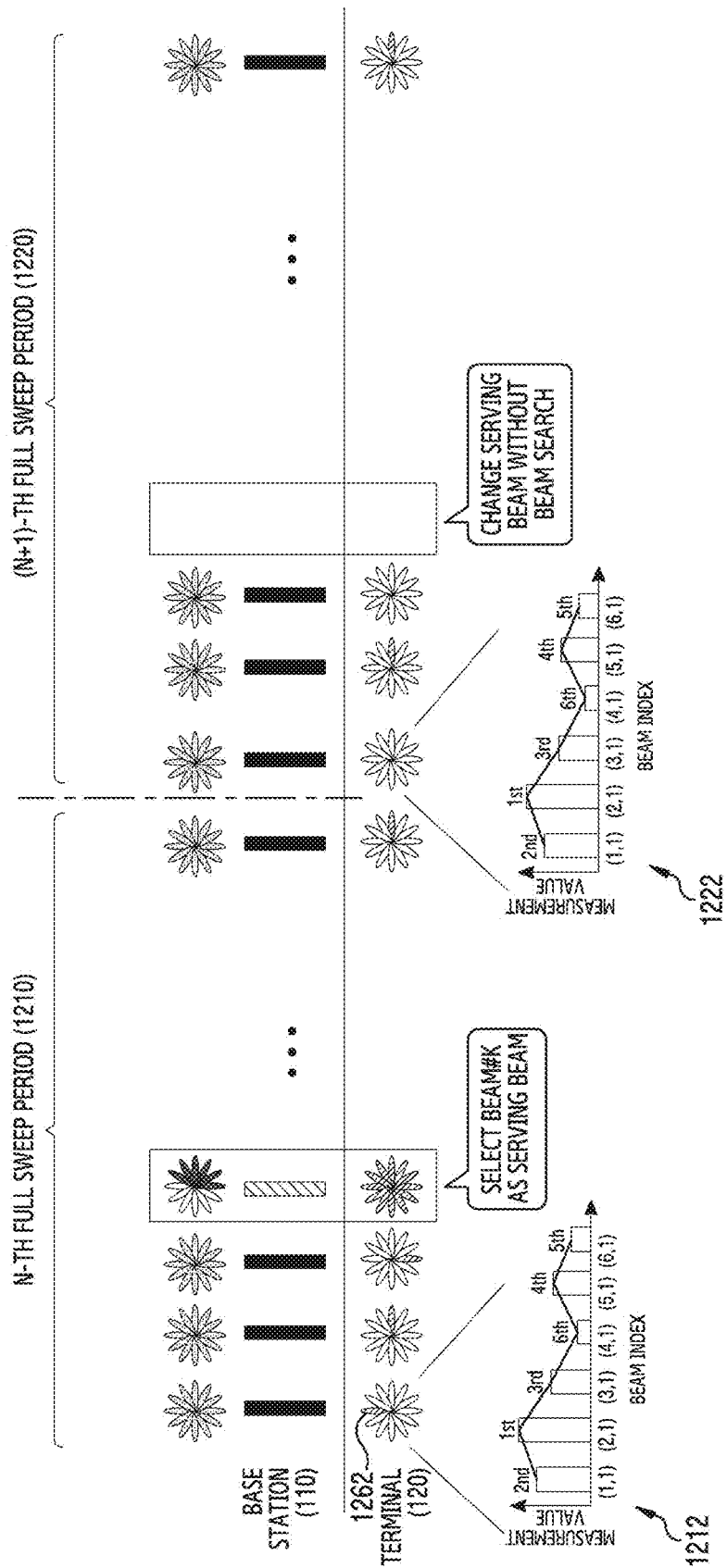
FIG. 12C illustrates an example of the beam recovery using the previous measurement results in the wireless communication system according to various embodiments of the disclosure.

A specific example of the embodiment described with reference to FIG. 12A or FIG. 12B is explained by referring to FIG. 12C. FIG. 12C illustrates an example of the beam recovery using the previous measurement results in the wireless communication system according to various embodiments of the disclosure.

Referring to FIG. 12C, in an n-th full sweep duration 1210, the base station 110 repeatedly transmits reference signals beamformed. At this time, the terminal 120 receives the reference signals using a plurality of receive beams. For the duration 1210, the terminal 120 acquires a plurality of measurement results including a measurement result 1212 corresponding to a receive beam 1262. In so doing, the beam misalignment is determined, and the terminal 120 selects a beam #k as the serving beam, through the beam recovery procedure.

Next, in an (n+x)-th full sweep duration 1220, the base station 110 repeatedly retransmits the beamformed reference signals. At this time, the terminal 120 acquires a measurement pattern 1222 for at least one receive beam. Next, the terminal 120 determines occurrence of the beam misalignment, and identifies a previous measurement pattern similar to the measurement pattern 1222. In FIG. 12C, the measurement pattern 1212 obtained in the duration 1210 is similar to the measurement pattern 1222. Hence, without the beam search, the terminal 120 sets the beam #k which was selected via the recovery procedure by the beam misalignment declaration in the duration 1210 as the serving beam.

According to the embodiment described with reference to FIG. 12A through FIG. 12C, the beam recovery is feasible without the beam search procedure, by using the previous measurement result. Further, the disclosure now explains another embodiment for recovering the beam without the beam search by referring to FIG. 13A through FIG. 13D.

Figure 13A:
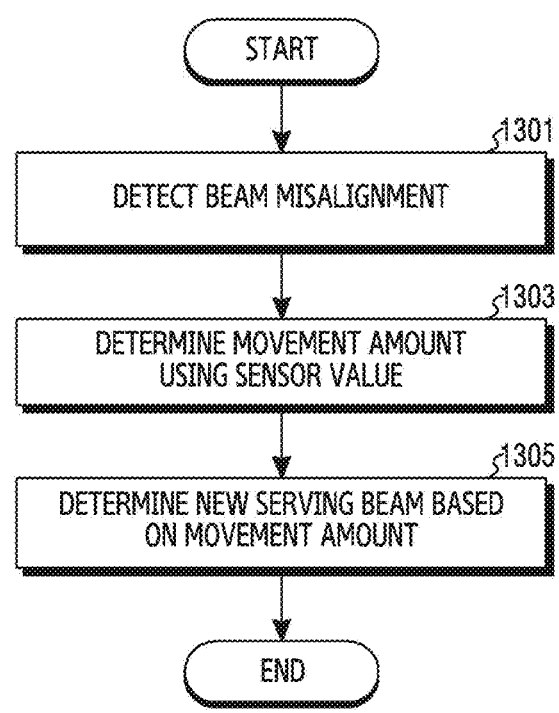
FIG. 13A illustrates an operating method for recovering a beam using a sensor value in a wireless communication system according to various embodiments of the disclosure.
Figure 13B:
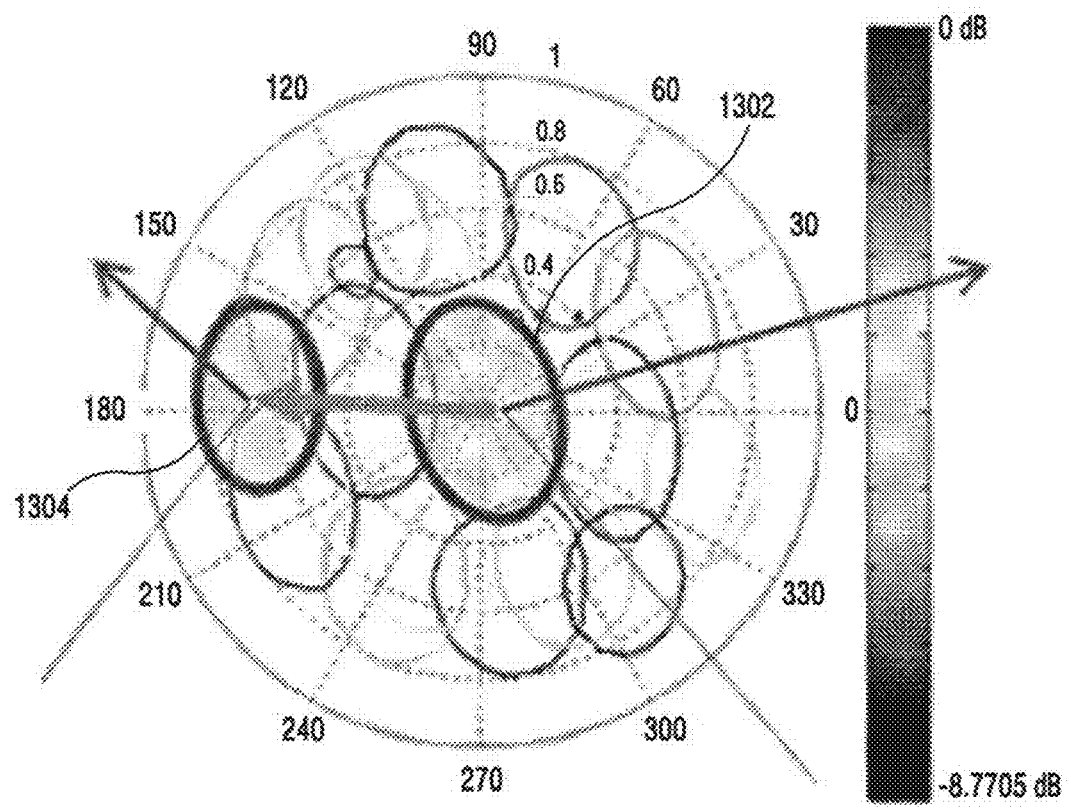
FIG. 13B illustrates an example of sensor value change based on movement in the wireless communication system according to various embodiments of the disclosure.

FIG. 13A illustrates an operating method for recovering a beam using a sensor value in a wireless communication system according to various embodiments of the disclosure. FIG. 13A illustrates the operating method of the terminal 120.

Referring to FIG. 13A, in step 1301, the terminal detects beam misalignment. The terminal may perform measurement on at least one receive beam, compare measurement values with measurement values previously acquired, and then detect the beam misalignment based on comparison results. For example, the terminal may detect the beam misalignment according to one of the various embodiments as mentioned above.

In step 1303, the terminal determines a movement amount by using a sensor value. Herein, the sensor value is a value indicating a physical change obtained by at least one sensor capable of measuring rotation and displacement of the terminal. For example, to determine the movement amount, at least one of a gyro sensor, an acceleration sensor, a compass sensor (Campus), a gravity sensor (G-sensor) may be used.

In step 1305, the terminal determines a new serving beam based on the movement amount. Based on the movement amount, that is, the rotation and the displacement of the terminal, the terminal determines the rotation/displacement of an antenna, and selects the new serving beam for compensating the rotation/displacement of the antenna. For example, referring to FIG. 13B, in coordinates 1302 (X1, Y1, Z1) of a main gain direction of a current serving beam, the terminal may determine coordinates 1304 (X2, Y2, Z2)=(X1+dx, dy+Y1, Z1+dz) of a new main gain direction, by reflecting the movement amount (dX, dY, dZ) measured by the sensor. The terminal may select the beam having the most similar direction to the new main gain direction as the serving beam.

In the embodiment of FIG. 13A, the beam misalignment detection of step 1301 is performed using the measurement values of the reference signals according to various embodiments of described above. However, according to another embodiment, the detection of the beam misalignment may be performed based on the sensor value as well. Specifically, if the movement amount which is greater than the threshold value measured by the sensor, the terminal may declare the beam misalignment. According to yet another embodiment, for more accurate beam misalignment detection, the beam misalignment may be detected based on the measurement values of the reference signals as well as the sensor value. In this case, even if an activity level of the sensor is not measured correctly, if the change of the measurement pattern is used together, the beam misalignment may be detected more accurately.

Figure 13C:
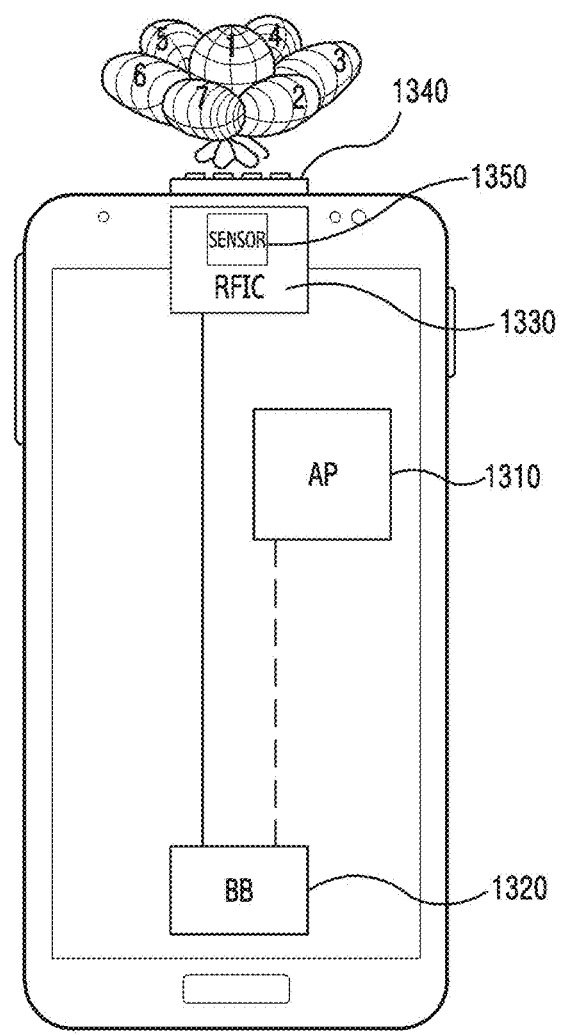
FIG. 13C and FIG. 13D illustrate sensor installation examples in the wireless communication system according to various embodiments of the disclosure.
Figure 13D:
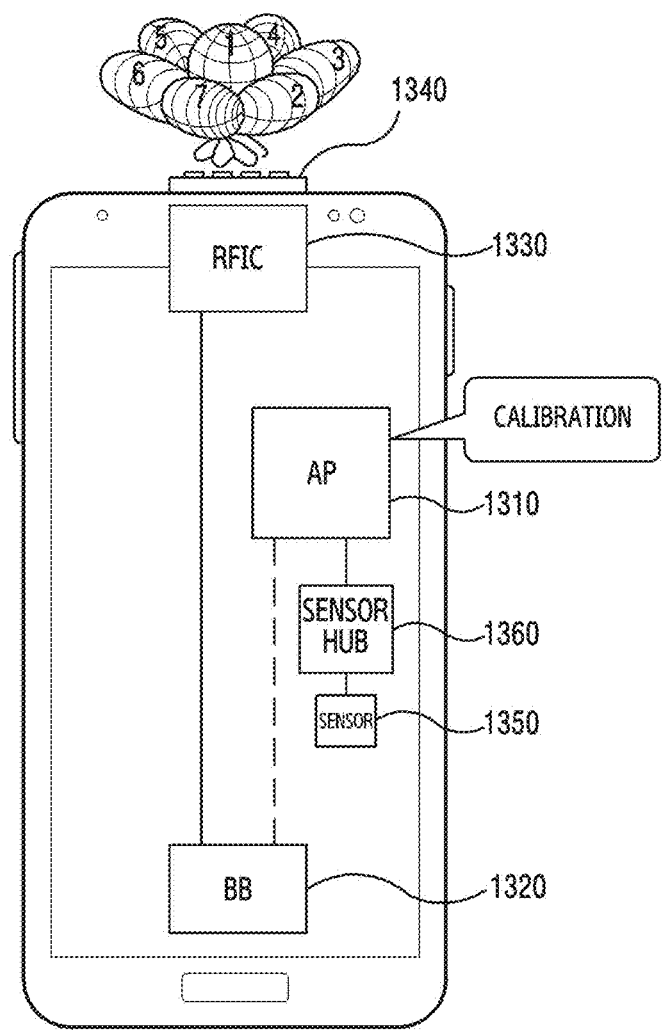

According to the embodiments described by referring to FIG. 13A, by use of the sensor value, the beam recovery is feasible without beam search procedure. If performing the beam misalignment detection or the beam recovery using the sensor value as shown in FIG. 13A, an installation position of the sensor may affect the accuracy. For example, if the sensor and the antenna are spaced over a specific distance, the movement amount obtained through the sensor value may be different from the movement amount of the antenna. To overcome the difference of the movement amount based on the installation position of the sensor, a structure of FIG. 13C or FIG. 13D may be applied. FIG. 13C and FIG. 13D illustrate sensor installation examples in the wireless communication system according to various embodiments of the disclosure.

Referring to FIG. 13C, the terminal includes an AP 1310, a baseband (BB) circuit 1320, an RFIC 1330, and an antenna 1340, and a sensor 1350 is installed in the RFIC 1330. Since path loss is considerable according to characteristics of the millimeter wave, the RFIC 1330 may be disposed close to the antenna 1340. Hence, if the sensor 1350 is installed in the RFIC 1330, the sensor 1350 is installed physically close to the antenna 1340. In this case, the movement amount determined based on the measurement values measured by the sensor 1350 may be treated as the movement of the antenna 1340. At this time, the sensor 1350 may be an additional component for measuring the movement of the antenna 1340, separately from a sensor used for other purpose.

Referring to FIG. 13D, the terminal includes the AP 1310, the BB circuit 1320, the RFIC 1330, and the antenna 1340, and includes the sensor 1350 and a sensor hub 1360. Unlike the embodiment of FIG. 13C, the structure of FIG. 13D does not specify the position of the sensor 1350. Notably, the AP 1310 or another processor performs calibration on the movement amount using information regarding the installation position of the sensor 1350 and the installation position of the antenna 1340, and sets a compensation value. Hence, the terminal may compensate the sensor value measured by the sensor 1350 or the new direction coordinates determined from the sensor value based on the compensation value, and then use it as a value for the antenna.

The methods according to the embodiments described in the claims or the specification of the disclosure may be implemented in hardware, software, or a combination of hardware and software.

For the software implementation, a computer-readable storage medium which stores one or more programs (software modules) may be provided. One or more programs stored in the computer-readable storage medium may be configured for execution by one or more processors of an electronic device. One or more programs may include instructions for enabling the electronic device to execute the methods according to the embodiments described in the claims or the specification of the disclosure.

Such a program (software module, software) may be stored to a random access memory, a non-volatile memory including a flash memory, a read only memory (ROM), an electrically erasable ROM (EEPROM), a magnetic disc storage device, a compact disc (CD)-ROM, digital versatile discs (DVDs) or other optical storage devices, and a magnetic cassette. Alternatively, the programs may be stored to a memory combining part or all of them. Also, a plurality of memories may be included.

Also, the programs may be stored in an attachable storage device accessible via a communication network such as Internet, Intranet, local area network (LAN), wide LAN (WLAN), or storage area network (SAN), or a communication network by combining these networks. Such a storage device may access an apparatus which realizes an embodiment of the disclosure through an external port. Also, a separate storage device on the communication network may access the apparatus which realizes an embodiment of the disclosure.

In the specific embodiments of the disclosure as described above, the elements included in the disclosure are expressed in a singular or plural form. However, the singular or plural expression is appropriately selected according to a proposed situation for the convenience of explanations, the disclosure is not limited to a single element or a plurality of elements, the elements expressed in the plural form may be configured as a single element, and the elements expressed in the singular form may be configured as a plurality of elements.

Meanwhile, the detailed description of the disclosure has been described with reference to certain embodiments thereof, but various modifications may be made without departing from the scope of this disclosure. Therefore, the scope of this disclosure should not be limited to the described embodiments but should be defined by the claims as below and their equivalents within the scope of the claims.

What is claimed is:

1. A method performed by a terminal in a wireless communication system, the method comprising:
    receiving a plurality of reference signals for a first period;
    receiving a plurality of reference signals for a second period; and
    identifying a beam misalignment based on a first pattern information and second pattern information,
    wherein the first pattern information is obtained based on first measurement values for the plurality of reference signals for the first period, and
    wherein the second pattern information is obtained based on second measurement values for the plurality of reference signals for the second period.

2. The method of claim 1, wherein the first measurement values and the second measurement values comprise two or more measurement values for at least one same beam.

3. The method of claim 1, wherein the identifying of the beam misalignment comprises:
    if a change of measurement values between the first measurement values and the second measurement values is greater than a first threshold, comparing an order of beams based on the first measurement values and the second measurement values; and
    if the order is consecutively changed over a second threshold in number of times, identifying that the beam misalignment occurs.

4. The method of claim 3, wherein the order of the beams is determined such that beams corresponding to measurement values having a difference below a third threshold have the same ranking.

5. The method of claim 1, wherein whether the beam misalignment occurs is identified in a sleep duration, while operating in a discontinuous operation mode which periodically deactivates a receiving circuit, and further comprising:
    in response to identifying that the beam misalignment does not occur, deactivating the receiving circuit before an on duration.

6. The method of claim 1, further comprising:
    in response to identifying that the beam misalignment occurs, transmitting, to a base station, a message requesting to transmit reference signals that are specific to the terminal; and
    identifying a new serving beam based on the reference signals.

7. The method of claim 1, further comprising:
in response to identifying that the beam misalignment occurs, identifying previous measurement values having a similar pattern to a pattern of the second measurement values; and
identifying a serving beam identified in the previous measurement values as a new serving beam.

8. The method of claim 1, further comprising:
in response to identifying that the beam misalignment occurs, identifying a new serving beam, based on direction coordinates of a main gain of a current serving beam and a rotation amount or a relocation amount measured by at least one sensor.

9. The method of claim 1,
wherein the first pattern information includes an order of the first measurement values, and
wherein the second pattern information includes an order of the second measurement values.

10. A method for operating a terminal in a wireless communication system, the method comprising:
activating a receiving circuit, to receive a signal, in an on duration of a discontinuous operation mode;
identifying whether a sleep duration has arrived;
in response to identifying that the sleep duration has arrived, deactivating the receiving circuit;
after a first portion of the sleep duration passes, identifying whether a beam is misaligned; and
in response to identifying that the beam is misaligned, activating the receiving circuit to recover the beam for a second portion of the sleep duration.

11. The method of claim 10, further comprising:
in response to the beam is not misaligned, deactivating the receiving circuit for the second portion.

12. The method of claim 10, wherein the second portion has a length over a time required to perform a procedure for recovering the beam.

13. A terminal in a wireless communication system, the terminal comprising: a transceiver; and
at least one processor coupled to the transceiver and configured to:
receive a plurality of reference signals for a first period,
receive a plurality of reference signals for a second period, and
identify a beam misalignment based on a first pattern information and a second pattern information,
wherein the first pattern information is obtained based on first measurement values for the plurality of reference signals for the first period, and
wherein the second pattern information is obtained based on second measurement values for the plurality of reference signals for the second period.

14. The terminal of claim 13, wherein the first measurement values and the second measurement values comprise two or more measurement values for at least one same beam.

15. The terminal of claim 13, wherein the at least one processor is further configured to:
if a change of measurement values between the first measurement values and the second measurement values is greater than a first threshold, compare an order of beams based on the first measurement values and the second measurement values, and
if the order is consecutively changed over a second threshold in number of times, identify that the beam misalignment occurs.

16. The terminal of claim 13,
wherein whether the beam misalignment occurs is identified in a sleep duration, while operating in a discontinuous operation mode which periodically deactivates a receiving circuit, and
wherein the at least one processor is further configured to, in response to identifying that the beam misalignment does not occur, deactivate the receiving circuit before an on duration.

17. The terminal of claim 13, wherein the at least one processor is further configured to:
in response to identifying that the beam misalignment occurs, transmit, to a base station, a message requesting to transmit reference signals that are specific to the terminal, and
identify a new serving beam based on the reference signals.

18. The terminal of claim 13, wherein the at least one processor is further configured to:
in response to identifying that the beam misalignment occurs, identify previous measurement values having a similar pattern to a pattern of the second measurement values, and
identify a serving beam identified in the previous measurement values as a new serving beam.

19. The terminal of claim 13,
wherein the first pattern information includes an order of the first measurement values, and
wherein the second pattern information includes an order of the second measurement values.

* * * * *